(12) United States Patent
Pettersson et al.

(10) Patent No.: US 11,477,470 B2
(45) Date of Patent: Oct. 18, 2022

(54) ENCODING AND DECODING PICTURES BASED ON TILE GROUP ID

(71) Applicant: Telefonaktiebolaget LM Ericsson (publ), Stockholm (SE)

(72) Inventors: Martin Pettersson, Vallentuna (SE); Mitra Damghanian, Upplands-Bro (SE); Rickard Sjöberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/957,527

(22) PCT Filed: Oct. 2, 2019

(86) PCT No.: PCT/EP2019/076718
§ 371 (c)(1),
(2) Date: Jun. 24, 2020

(87) PCT Pub. No.: WO2020/070196
PCT Pub. Date: Apr. 9, 2020

(65) Prior Publication Data
US 2021/0058633 A1    Feb. 25, 2021

Related U.S. Application Data

(60) Provisional application No. 62/740,360, filed on Oct. 2, 2018.

(51) Int. Cl.
*H04N 9/44*     (2006.01)
*H04N 19/44*    (2014.01)
*H04N 19/597*   (2014.01)

(52) U.S. Cl.
CPC ........... *H04N 19/44* (2014.11); *H04N 19/597* (2014.11)

(58) Field of Classification Search
CPC .............................. H04N 19/44; H04N 19/597
See application file for complete search history.

(56) References Cited

U.S. PATENT DOCUMENTS 9,300,976 B2    3/2016  Fuldseth
9,736,482 B2    8/2017  Hendry et al.
(Continued)

FOREIGN PATENT DOCUMENTS

CN    105744272 A    7/2016
EP      3328081 A1    5/2018
(Continued)

OTHER PUBLICATIONS

Sullivan, Gary J., et al. "Standardized extensions of high efficiency video coding (HEVC)." IEEE Journal of selected topics in Signal Processing 7.6 (2013): 1001-1016. (Year: 2013).*
(Continued)

*Primary Examiner* — Tat C Chio
(74) *Attorney, Agent, or Firm* — Coats & Bennett, PLLC

(57) ABSTRACT

An encoder and a decoder are provided for encoding, and decoding pictures, respectively. The encoder defines a structure for a picture segment by dividing the picture into multiple picture segment groups and assigning a unique group ID to each group. Each picture segment group is further divided into one or more picture segments or "tiles," with each picture segment being assigned the ID of its picture segment group. The encoder then encodes the picture segments of the picture segment groups into a bit stream, and sends the bit stream to the decoder. Upon receiving the bit stream, the decoder extracts each picture segment group as a single entity and decodes the picture segments in each picture segment group in a predetermined order.

13 Claims, 16 Drawing Sheets

(56) References Cited

U.S. PATENT DOCUMENTS

| | | | |
|---|---|---|---|
| 10,893,268 | B2 | 1/2021 | Jun et al. |
| 2009/0279601 | A1 | 11/2009 | Strom et al. |
| 2009/0320081 | A1 | 12/2009 | Chui et al. |
| 2012/0189049 | A1 | 7/2012 | Coban et al. |
| 2012/0328004 | A1* | 12/2012 | Coban ............ H04N 19/90 375/240.03 |
| 2013/0016786 | A1 | 1/2013 | Segall |
| 2013/0101035 | A1* | 4/2013 | Wang ............ H04N 19/70 375/240.12 |
| 2013/0114735 | A1 | 5/2013 | Wang |
| 2014/0086333 | A1* | 3/2014 | Wang ............ H04N 21/8451 375/240.25 |
| 2014/0119671 | A1 | 5/2014 | Lim et al. |
| 2016/0295200 | A1* | 10/2016 | Bruls ............ H04N 13/302 |
| 2017/0034526 | A1 | 2/2017 | Rapaka et al. |
| 2018/0098077 | A1 | 4/2018 | Skupin et al. |
| 2018/0139453 | A1 | 5/2018 | Park et al. |
| 2018/0249163 | A1* | 8/2018 | Curcio ............ H04N 19/115 |
| 2019/0132590 | A1 | 5/2019 | Morigami et al. |
| 2019/0273923 | A1* | 9/2019 | Huang ............ H04N 19/124 |
| 2019/0281217 | A1 | 9/2019 | Kim |
| 2020/0029080 | A1 | 1/2020 | Kim et al. |
| 2020/0260063 | A1 | 8/2020 | Hannuksela |
| 2020/0260071 | A1 | 8/2020 | Hannuksela et al. |
| 2020/0322587 | A1 | 10/2020 | Oh et al. |
| 2020/0336740 | A1 | 10/2020 | Fang et al. |
| 2020/0374505 | A1 | 11/2020 | Kammachi Sreedhar et al. |
| 2021/0195226 | A1 | 6/2021 | Zhao et al. |
| 2021/0385514 | A1 | 12/2021 | Da Silva Pratas Gabriel et al. |

FOREIGN PATENT DOCUMENTS

| | | |
|---|---|---|
| GB | 2557430 A | 6/2018 |
| RU | 2648571 C2 | 3/2018 |
| WO | 2013027407 A1 | 2/2013 |
| WO | 2013063094 A1 | 5/2013 |
| WO | 2014003428 A1 | 1/2014 |
| WO | 2016123476 A1 | 8/2016 |
| WO | 2017137444 A1 | 8/2017 |
| WO | 2017172783 A1 | 10/2017 |
| WO | 2017212930 A1 | 12/2017 |

OTHER PUBLICATIONS

He, Y. et al., "AHG12: On Rectangular Tile Group", Joint Video Experts Team (JVET) of ITU-T SG 16 WP 3 and ISO/IEC JTC 1/SC 29/WG 11 13th Meeting, Marrakech, MA, Jan. 9, 2019, pp. 1-9, JVET-M0121, ITU.

Bross, B. et al., "Versatile Video Coding (Draft 4)", Joint Video Experts Team (JVET) of ITU-T SG 16 WP 3 and ISO/IEC JTC 1/SC 29/ WG 11 13th Meeting, Marrakech, MA, Jan. 9, 2019, pp. 1-244, JVET-M1001-v2, ITU.

Sjöberg, R. et al., "Flexible Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-10, JVET-K0260-v2, ITU.

Hannuksela, M. et al., "Design Goals for Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-8, JVET-K0300-v1, ITU.

Wang, Y. et al., "Tile Groups", Joint Collaborative Team on Video Coding (JCT-VC) of ITU-T SG16 WP3 and ISO/IEC JTC1/SC29/WG11 8th Meeting, San Jose, USA, Feb. 1, 2012, pp. 1-8, JCTVC-G0520, ITU.

Sjöberg, R. et al., "Tile groups for VVC", Joint Video Experts Team (JVET) of ITU-T SG16 WP 3 and ISO/IEC JTC 1/SC 29/ WG 11 12th Meeting, Macao, CN, Oct. 3, 2018, pp. 1-4, JVET-L0415-v1, ITU.

Richardson, I., "Chapter 6: H.264/MPEG4 Part 10", H.264 and MPEG-4 Video Compression: Video Coding for Next-Generation Multimedia, Jan. 1, 2003, pp. 159-223, John Wiley & Sons, Ltd.

Bross, B. et al., "High Efficiency Video Coding (HEVC) Text Specification Draft 10 (for FDIS & Last Call)", Joint Collaborative Team on Video Coding (JCT-VC) of ITU-T SG 16 WP 3 and ISO/IEC JTC 1/SC 29/WG 11 12th Meeting, Geneva, CH, Jan. 14, 2013, pp. 1-310, JCTVC-L1003_v34, ITU.

Sjöberg, R. et al., "Flexible Tiles", Joint Video Experts Team (JVET) of ITU-T SG 16 WP 3 and ISO/IEC JTC 1/SC 29/WG 11 11th Meeting, Ljubljana, SI, Jul. 10, 2018, pp. 1-7, JVET-K0260-v1, ITU.

Wu, Y. et al., "Motion-Constrained Tile Sets SEI Message", Joint Collaborative Team on Video Coding (JCT-VC) of ITU-T SG 16 WP 3 and ISO/IEC JTC 1/SC 29/WG 11 13th Meeting, Incheon, KR, Apr. 18, 2013, pp. 1-4, JCTVC-M0235-v1, ITU.

Wiegand, T., "Draft Text of Final Draft International Standard for Advanced Video Coding (ITU-T Rec. H.264 | ISO/IEC 14496-10 AVC)", International Organization for Standardisation Coding of Moving Pictures and Audio, ISO/IEC JTC 1/SC 29/WG 11 N5555, Mar. 1, 2003, pp. 1-242, ITU.

Skupin, R. et al., "HEVC Tile Based Streaming to Head Mounted Displays", 2017 14th IEEE Annual Consumer Communications & Networking Conference (CCNC), Jan. 8, 2017, pp. 1-3, IEEE.

Sanchez, Y. et al., "Random Access Point Period Optimization for Viewport Adaptive Tile Based Streaming of 360 Video", 2017 IEEE International Conference on Image Processing (ICIP), Sep. 17, 2017, pp. 1-5, IEEE.

Puri, A. et al., "Video Coding Using the H.264/MPEG-4 AVC Compression Standard", Signal Processing: Image Communication, vol. 19 No. 9, Oct. 1, 2004, pp. 793-849, Elsevier.

Sánchez, Y. et al., "Compressed Domain Video Processing for Tile Based Panoramic Streaming Using HEVC", 2015 IEEE International Conference on Image Processing (ICIP), Sep. 27, 2015, pp. 2244-2248, IEEE.

International Telecommunication Union, "High efficiency video coding", Series H: Audiovisual and Multimedia Systems: Infrastructure of audiovisual services—Coding of moving video, Dec. 1, 2016, pp. 83-84, 352, ITU-T H.265, ITU.

* cited by examiner

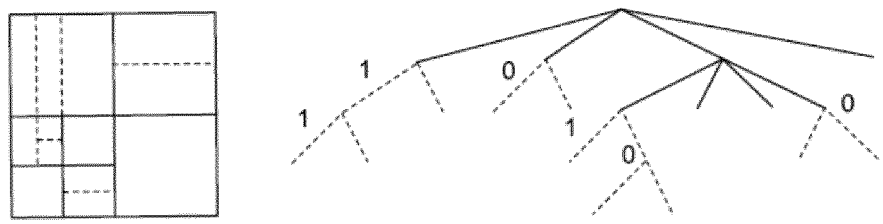
FIG. 1
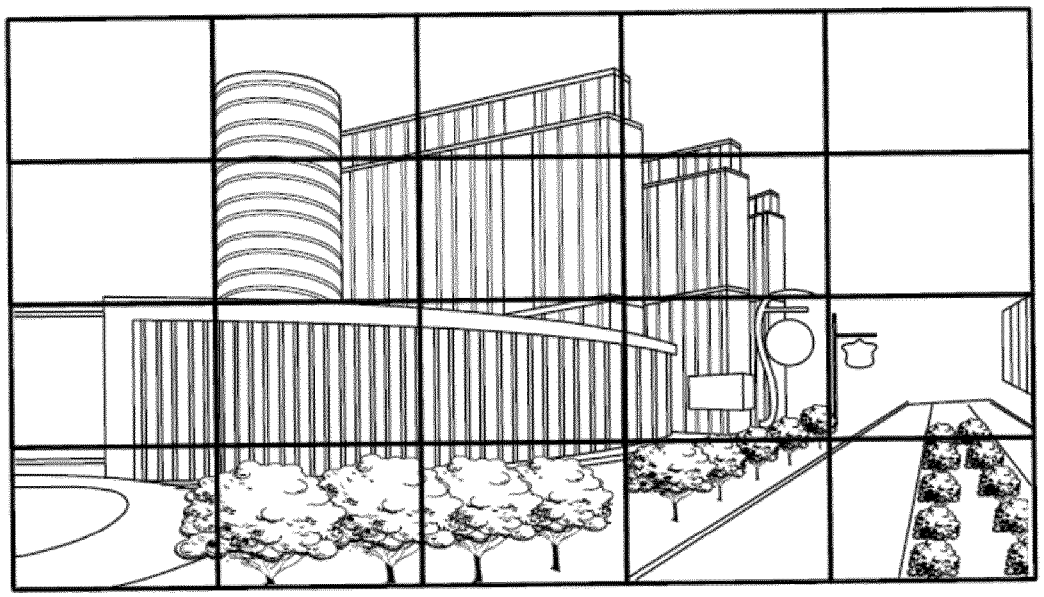
FIG. 2
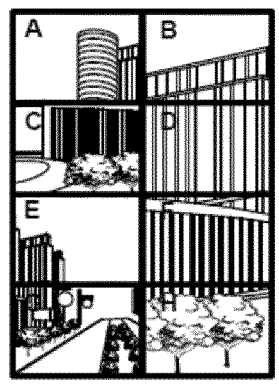 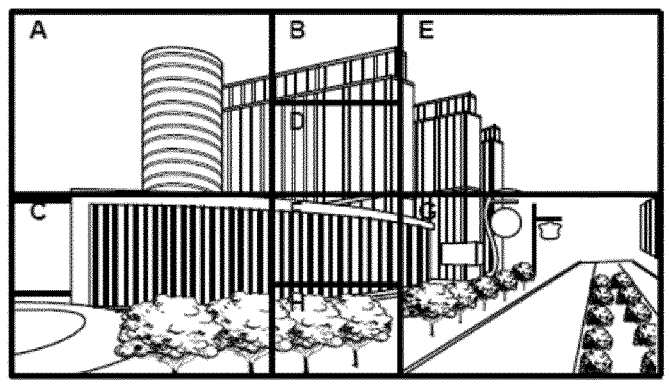
FIG. 3A  FIG. 3B

FIG. 14A
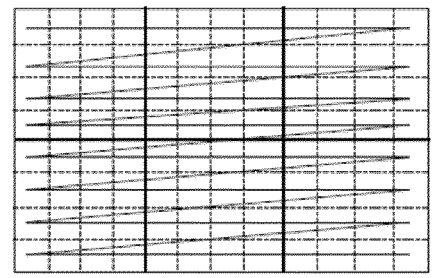
FIG. 14B
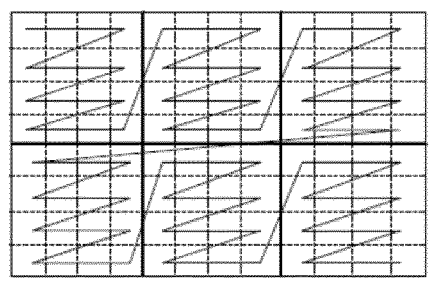
FIG. 14C
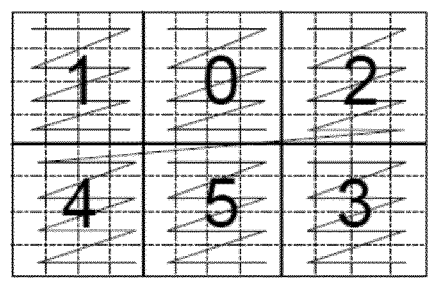
FIG. 14D
FIG. 15

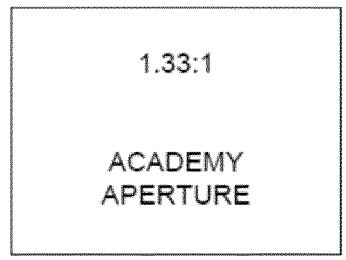
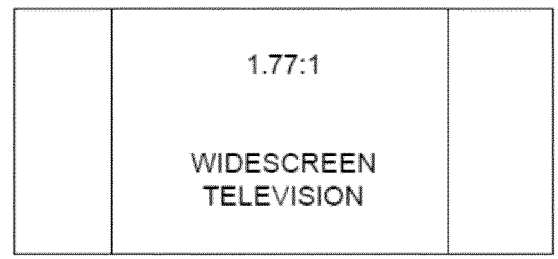
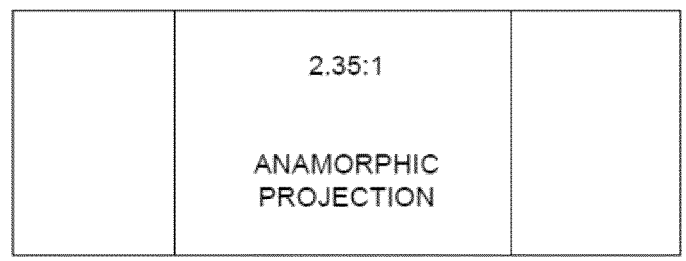
FIG. 20

ENCODING AND DECODING PICTURES BASED ON TILE GROUP ID

RELATED APPLICATIONS

This application claims priority to U.S. Application No. 62/740,360, filed 2 Oct. 2018, disclosure of which is incorporated in its entirety by reference herein.

TECHNICAL FIELD

The present disclosure relates generally to video encoding and decoding techniques, and more particularly, to the encoding and decoding of the segments of a picture.

BACKGROUND

High Efficiency Video Coding (HEVC) is a block based video codec standardized by both the ITU-T and the Moving Picture Experts Group (MPEG) that utilizes both spatial and temporal prediction techniques. Spatial prediction reduces spatial redundancy and is achieved using intra (I) prediction from within the same frame of a current picture. Temporal prediction reduces temporal redundancy and is achieved using inter (P) or bi-directional inter (B) prediction on a block level using previously decoded reference pictures. Regardless of the particular type of prediction technique, however, the resultant differences between the original pixel data and the predicted pixel data, referred to as the "residual," is transformed into the frequency domain and quantized. Quantizing the transformed residuals, the level of which is determined by the quantization parameter (QP), facilitates the control of a tradeoff between bitrate and the quality of the video.

The transformed and quantized residual is then entropy coded before being transmitted to a decoder together with the necessary prediction parameters. The prediction parameters, which are also entropy encoded, include prediction mode and motion vectors. Upon receipt, the decoder performs entropy decoding, inverse quantization, and inverse transformation to obtain the residual. The decoder then reconstructs the image from the residual using an intra-prediction or inter-prediction technique.

Both MPEG and ITU-T are working on a successor to HEVC within the Joint Video Exploratory Team (JVET). The name of this video codec is Versatile Video Coding (VVC).

SUMMARY

Embodiments herein are useful for encoding and decoding a picture partitioned into picture segments referred to herein as "tiles." For example, in one or more embodiments, a picture has a flexible partition structure where an edge of a first tile borders corresponding edges of two or more adjacent tiles in the picture. In these embodiments, tile group IDs may be used to identify which region of a picture each tile belongs to. With embodiments of the present disclosure, not all parts of a region need to be spatially adjacent.

Accordingly, one or more embodiments of the present disclosure provide a method of decoding a picture. In one embodiment, the method comprises receiving a bit stream comprising one or more coded picture segment groups, wherein each picture segment group comprises a group ID (e.g., a tile group ID as stated above) and one or more coded picture segments, extracting a first picture segment group from the bit stream as a single entity, and decoding the one or more picture segments in the first picture segment group in a predetermined order.

It should be noted that a "picture segment group" is commonly known to be a sub-part of a picture. Additionally, as known by those of ordinary skill in the art, a "tile group" is also commonly known to be a sub-part of a picture. Thus, as described in more detail later, a picture segment group is the same thing as a tile group.

Embodiments of the present disclosure also provide a decoder. In one embodiment, the decoder comprises a communications interface circuitry and processing circuitry. The communications interface circuitry is configured to receive a bit stream comprising one or more coded picture segment groups from an encoder, wherein each picture segment group comprises a group ID and one or more coded picture segments. The processing circuitry configured to extract a first picture segment group from the bit stream as a single entity, and decode the one or more picture segments in the first picture segment group in a predetermined order.

Embodiments of the present disclosure also provide a method of encoding a picture. In one embodiment, the method comprises defining a structure for a picture segment, wherein defining the structure comprises dividing the picture into a plurality of picture segment groups, and assigning a unique group ID to each picture segment group. The method also comprises, for each picture segment group, dividing the picture segment group into one or more tiles, and assigning the group ID of the picture segment group to each picture segments in the picture segment group. The method further comprises encoding the picture segments of each of the picture segment groups into the bit stream, and sending the encoded bit stream to a decoder.

Embodiments of the present disclosure also provide an encoder comprising communications interface circuitry and processing circuitry. In one embodiment, the communications interface circuitry is configured to send a bit stream comprising one or more coded picture segment groups to a decoder, wherein each picture segment group comprises a group ID and one or more coded picture segments. The processing circuitry configured to define a structure for the picture segments by dividing the picture into the plurality of picture segment groups and assigning a unique group ID to each picture segment group. Further, the processing circuitry is configured to, for each picture segment group, divide the picture segment group into one or more picture segments, and assign the group ID of the picture segment group to each picture segment in the picture segment group. The processing circuitry is further configured to encode the picture segments of each of the picture segment groups into the bit stream, and send the encoded bit stream to the decoder via the communications interface circuitry.

Embodiments of the present disclosure further provide a decoder circuit configured to receive a bit stream comprising one or more coded picture segment groups, wherein each picture segment group comprises a group ID and one or more coded picture segments, extract a first picture segment group from the bit stream as a single entity, and decode the one or more picture segments in the first picture segment group in a predetermined order.

Embodiments of the present disclosure further provide an encoder circuit configured to send a bit stream comprising one or more coded picture segment groups to a decoder, wherein each picture segment group comprises a group ID and one or more coded picture segments. The encoder circuit is further configured to define a structure for the picture segments by dividing the picture into the plurality of picture segment groups and assigning a unique group ID to each picture segment group. The encoder circuit is further configured to, for each picture segment group, divide the picture segment group into one or more picture segments and assign the group ID of the picture segment group to each picture segment in the picture segment group. The encoder circuit is further configured to encode the picture segments of each of the picture segment groups into the bit stream, and send the encoded bit stream to the decoder via the communications interface circuitry.

Those skilled in the art will also appreciate that embodiments herein further include corresponding apparatus, computer programs, and carriers containing such computer programs. For instance, in one or more embodiments a computer program comprises instructions which, when executed by a processing circuit in a decoder, causes the decoder to carry out any of the respective processing described above.

In one or more other embodiments, a computer program comprises instructions which, when executed by a processing circuit in an encoder, causes the encoder to carry out any of the respective processing described above.

Computer programs in this regard can comprise one or more code units or modules corresponding to the means or units described above.

Embodiments further include a carrier containing such computer programs. This carrier can comprise one of an electronic signal, optical signal, radio signal, or computer readable storage medium.

Embodiments herein also provide a non-transitory computer-readable storage medium containing a computer program that, when executed by a processing circuit in a decoder, causes the decoder to perform as described above.

Embodiments herein also provide a non-transitory computer-readable storage medium containing a computer program that, when executed by a processing circuit in an encoder, causes the encoder to perform as described above.

BRIEF DESCRIPTION OF THE DRAWINGS

FIG. 1 illustrates an example of partitioning a CTU into CUs using QTBT.

FIG. 2 illustrates an example tile partitioning.

FIGS. 3A-3B illustrate an example tiling structure with high resolution and low resolution tiles.

FIGS. 14A-14D illustrate a cube map and scanning orders according to one embodiment.

FIG. 15 illustrates an example of using tile groups when packing a cube map with different resolutions into a frame according to one embodiment.

FIG. 18 illustrates an example of frame packing for 3DoF+ video using tile groups according to one embodiment. Each tile group may consist of several tiles for spatial random access.

FIG. 19 illustrates an example of video encoded with three tile groups according to one embodiment.

FIG. 20 illustrates an example of some aspect ratios supported by the bit stream according to one embodiment.

DETAILED DESCRIPTION

Figure 4:
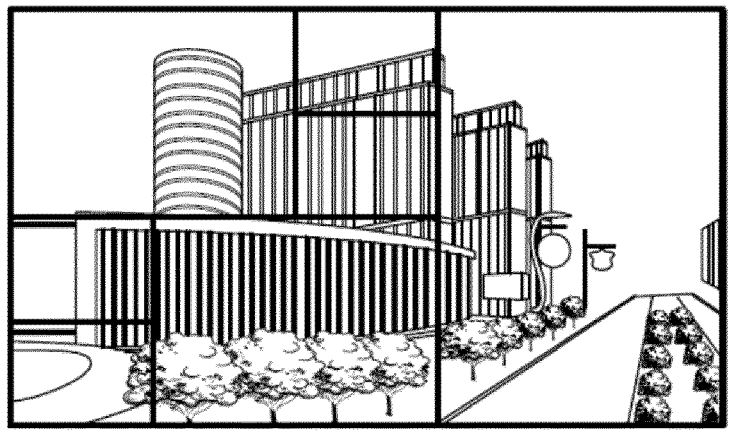
FIG. 4 illustrates an example of a tile structure that is not supported in HEVC.

As previously stated, HEVC is a block based video codec standardized by ITU-T and MPEG that utilizes both temporal and spatial prediction. HEVC uses a block structure where each top level coding block, i.e. the largest block in the coding block partitioning referred to herein as the Coding Tree Unit (CTU), is partitioned by a Quad Tree (QT) structure. This partitioning produces coding block partitions, referred to herein as coding units (CUs). The CUs can then be further partitioned, recursively, into smaller equally sized CUs with the quad tree structure down to an 8×8 block size.

The block structure in the current version of VVC is different than the block structure in HEVC. Particularly, the block structure in VVC is referred to as Quad Tree plus Binary Tree (QTBT) plus Ternary Tree (TT) block structure (QTBT+TT). A CU in QTBT+TT can have either square or rectangular shapes. A coding tree unit (CTU) is first partitioned by a quad tree structure as in HEVC. Then, it is further partitioned with equally sized partitions, either vertically or horizontally, in a binary structure to form coding blocks (also referred to as coding units—CUs). A block could thus have either a square or rectangular shape.

The depth of the quad tree and the binary tree can be set by the encoder in the bit stream. An example of dividing a CTU using QTBT+TT is illustrated in FIG. 1. The TT allows the CU to be divided into three partitions instead of two equally sized partitions. This increases the possibility of using a block structure that better fits the content structure in a picture.

Context Adaptive Binary Arithmetic Coding (CABAC) is an entropy coding tool used in HEVC and VVC. CABAC is configured to encode binary symbols, which keeps complexity low and allows modelling of probabilities for bits of a symbol that are more frequently used. The probability models are selected adaptively based on local context, since coding modes are usually well correlated locally.

The concept of slices in HEVC divides the picture into independently coded slices, where each slice is read in raster scan order in units of CTUs. Different coding types could be used for slices of the same picture. For example, a slice could either be an I-slice, P-slice or B-slice. However, the main purpose of slices is to enable resynchronization in case of a loss of data.

The HEVC video coding standard also includes a tool called "Tiles" that divides a picture into rectangular, spatially independent regions. Using tiles, a picture in HEVC can be partitioned into rows and columns of samples where any given tile is located at an intersection of a given row and a given column. FIG. 2 shows an example of a tile partitioning using four (4) rows of tiles and five (5) columns of tiles resulting in a total of twenty (20) tiles for the picture. As seen in FIG. 2, the tiles in HEVC are always aligned with CTU boundaries.

The tile partitioning structure, also referred to herein as "tile structure," is signaled in the Picture Parameter Set (PPS) by specifying the thicknesses of the rows and the widths of the columns. Individual rows and columns can have different sizes, but the partitioning always spans across the entire picture, from left to right and top to bottom, respectively.

The PPS syntax used for specifying the tile structure in HEVC is listed in Table 1. As seen in Table 1, a flag (i.e., the tiles_enabled_flag) indicates whether tiles are used or not used. If the tiles_enabled_flag is set, the number of tiles columns (i.e., num_tile_columns_minus1) and rows (i.e., num_tile_rows_minus1) are specified. The uniform spacing flag is a flag that specifies whether the column widths and row heights are explicitly signaled, or whether a predefined method to space the tile borders evenly should be used. If explicit signaling is indicated, the column widths are signaled one-by-one followed by the row heights. The column width and row height information is signaled in CTU units. Finally, the flag loop_filter_across_tiles_enabled_flag specifies whether in-loop filters across tile boundaries are turned on or off for all tile boundaries in the picture.

TABLE 1

| Tile syntax in HEVC | |
|---|---|
| pic_parameter_set_rbsp( ) { | Descriptor |
| ... | |
|   tiles_enabled_flag | u(1) |
| ... | |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |

TABLE 1-continued

| Tile syntax in HEVC | |
|---|---|
| pic_parameter_set_rbsp( ) { | Descriptor |
|   loop_filter_across_tiles_enabled_flag | u(1) |
| } | |
| ... | |

Similar to slices, there is no decoding dependency between tiles of the same picture. This includes intra prediction, context selection and motion vector prediction. One exception, however, is that in-loop filtering dependencies are generally allowed between tiles. Those dependencies can, however, be disabled by setting the loop_filter_across_tiles_enabled_flag appropriately.

In contrast to slices, tiles do not require as much header data. The header overhead per tile comprises the signaling of bit-stream offsets, which are present in the slice header and indicate the starting point of all tiles in a picture. A decoder decodes the starting points to enable splitting the coded picture into coded tiles in order to distribute them for parallel decoding. In HEVC, the inclusion of bit-stream offsets in the slice header is mandatory when tiles are enabled. However, the combination of tiles and slices is restricted in HEVC. Particularly, either all CTUs in a tile belong to the same slice or all CTUs belong to the same tile.

Bit-stream offsets can also allow the extraction of tiles and stitching of tiles to re-constitute the tiles into an output stream. This requires some encoder side constraints to make the tiles temporally independent. One constraint restricts motion vectors so that motion compensation for a tile only uses samples included in spatially co-located tiles of previous pictures. Another constraint restricts temporal motion vector prediction (TMVP) such that this process is made temporally independent. For complete independence, the deblocking of boundaries between tiles must be disabled via the previously described loop_filter_across_tiles_enabled_flag. However, disabling deblocking may introduce visible lines between tiles. Therefore, some implementations disable deblocking while other implementations do not. Motion constrained tile set (MCTS) is a feature in HEVC for signaling the encoder side constraints for temporal independent tile sets. A tile set in MCTS covers one or more tiles of a picture.

Tiles are sometimes used for 360-degree video that is intended for consumption using head-mounted display (HMD) devices. The field-of-view when using today's HMD devices is limited to around 20% of a full sphere. This means that only 20% of the full 360-degree video is consumed by the user. Typically, the entire 360-degree video sphere is made available to the HMD device, which then crops out the part that is rendered for the user. The part of the sphere the user sees is called the viewport. A well-known optimization of resources is to make the HMD device video system aware of head movements and the direction the user is looking so that fewer resources are spent on processing video samples that are not rendered to the user. The resources can be, for example, bandwidth from a server to a client or the decoding capability of the device. For future HMD devices, where the field of view will be larger than is currently possible, a non-uniform resource allocation would still be beneficial. Particularly, the human vision system demands a higher image quality in the central vision area (about 18° horizontal view), while a lower demand is placed on the image quality in the peripheral region (about 120° or more for a comfortable horizontal view). Therefore, non-uniform resource allocation would be helpful to meet the demands of the human vision system with more resources being allocates in the central vision area as compared to the peripheral region.

Optimizing resources to the Region of Interest (RoI) is another use case for tiles. RoI can be specified in the content or extracted by methods such as eye tracking. One method of using head movements to reduce the amount of required resources is to use tiles. This method first encodes the video sequence multiple times using tiles. The tile partitioning structure is the same in all encodings; however, the video sequence is encoded at different video qualities. This produces at least one high-quality encoding for the video sequence and one low-quality encoding for the video sequence. This means that for each tile at a particular point in time, there are at least one high-quality tile representation and at least one low-quality tile representation. The difference between a high-quality tile and a low-quality tile can be that the high-quality tile is encoded at a higher bitrate than the low-quality tile, or that the high-quality tile is of higher resolution than the low-quality tile.

FIGS. 3A-3B illustrate an example of high-quality tiles having higher resolution than low-quality tiles. Particularly, FIG. 3A illustrates a picture that just has been decoded by a decoder. In this context, pictures showing the output from the decoder (i.e., the decoded pictures) are pictures shown in the compressed domain. In the example of FIG. 3A, all 8 tiles A-H in the compressed domain are of equal spatial size. Then, after the picture is decoded, but before the picture is rendered, the tiles A-H are scaled and arranged spatially. Pictures that have been prepared for rendering (i.e., after scaling and re-arrangement) are pictures to be shown in the output domain. The output domain, seen in FIG. 3B, illustrates the picture as it is rendered or presented to the user.

As seen in FIGS. 3A-3B, tiles B, D, F, and H are high-quality tiles since they are of higher resolution in the output domain. Tiles A, C, E, and G, however, are low-resolution tiles since the scaling step decreases the actual resolution.

Besides illustrating how tiles have different resolutions, FIGS. 3A-3B also illustrate that tiles in the compressed domain (FIG. 3A) do not need to be spatially ordered in the same way as they are ordered in the output domain (FIG. 3B). Given that the tiles are both spatially and temporally independent, the spatial placement of tiles in the compressed domain is not vital.

There are multiple elements that increase bit-costs when enabling tiles in HEVC. First, prediction across tiles is disabled, which means that motion vectors and intra modes are not predicted across tiles. The use of tiles also disables quantization parameter (QP) prediction and context selection. Second, CABAC is initialized for each tile, which means that CABAC adaptation is impaired. Third, bitstream offsets must be signaled for each tile. Fourth, the tile partitioning structure needs to be specified in the PPS. Finally, CABAC is flushed after each tile and the coded data has to be byte-aligned.

Tiles are useful; however, there are some considerations that need to be addressed. For example, in its current form, HEVC restricts tiles to ensure that they span across the entire picture both vertically and horizontally. This limits the flexibility of tiles, however. For example, FIG. 4 illustrates an example of a tile structure that is not supported by the current implementation of HEVC. In particular, the tile structure of FIG. 4 has tiles arranged in a manner such that one side of a given tile (i.e., a "tile boundary") contacts the sides or tile boundaries of multiple adjacent tiles.

Figure 5:
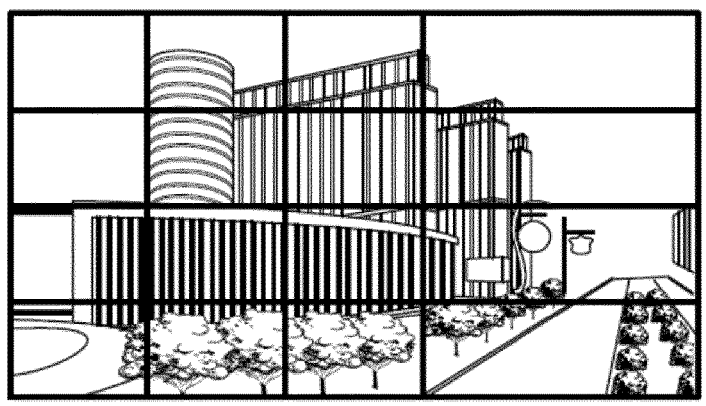
FIG. 5 illustrates an example tile structure that can be supported in HEVC.
Figure 6A:
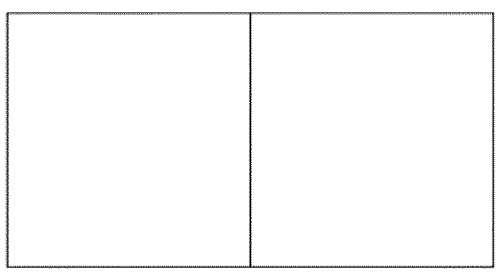
FIGS. 6A-6B illustrate examples of frame packing side-by-side (FIG. 6A) and top-bottom (FIG. 6B).
Figure 6B:
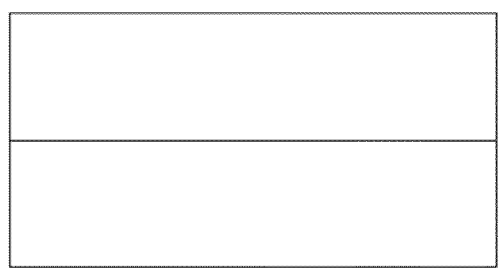

In order to virtually support a tile structure, one may specify the partition structure in HEVC seen in FIG. 5. However, the tile structure seen in FIG. 5 comprises more tile boundaries. This can harm compression efficiency and cause unnecessary tiling artifacts. Additionally, if the tiles are to be completely spatially independent, HEVC in its current form only allows for either enabling or disabling the in-loop filtering dependencies for all tile boundaries of a picture. Therefore, unnecessary in-loop filtering restrictions will occur with conventional HEVC solutions because they do not support flexible tile partitions.

The concept of "flexible tiles" addresses these issues by providing flexible tile partitioning methods. Particularly, each tile comprises a single rectangular area, and the width and height of each tile is signaled to a decoder in a bit stream. Upon receipt, the decoder is configured to decode the individual width and height values for each tile from the bit stream. These methods provide more freedom for an encoder to partition pictures into tiles because it means that encoders are no longer limited to defining the number of tile rows and tile columns, as in HVEC.

Table 2 illustrates one possible tile syntax for expressing flexible tiles.

TABLE 2

| Flexible tile embodiment | |
|---|---|
| pic_parameter_set_rbsp( ) { | Descriptor |
| ... | |
|   tiles_enabled_flag | u(1) |
| ... | |
|   if( tiles_enabled_flag ) { | |
|     number_of_tiles_in_picture_minus2 | ue(v) |
|     subtile_width_minus1 | ue(v) |
|     subtile_height_minus1 | ue(v) |
|     for ( i=0; i < number_of_tiles_in_picture_minus2+2 ; i++ ) { | |
|       if ( i > 0) | |
|         use_previous_tile_size_flag | u(1) |
|       if ( use_previous_tile_size_flag ==0) { | |
|         tile_width_minus1[ i ] | ue(v) |
|         tile_height_minus1[ i ] | ue(v) |
|       } | |
|     } | |
|     loop_filter_across_tiles_enabled_flag | u(1) |
|   } | |
| ... | |

Semantics for the Syntax Elements in Table 2 number_of_tiles_in_picture_minus2: specifies the number of tiles in a picture;

subtile_width_minus1: specifies the width of the subtile unit in coding tree units;

subtile_height_minus1: specifies the height of the subtile unit in coding tree units;

use_previous_tile_size_flag: When this flag is equal to 1, it specifies that the size of the current tile is equal to the size of the previous tile. When equal to 0, however, it specifies that the size of the current tile is not equal to the size of the previous tile. When the flag is not present, the value of use_previous_tile_size_flag is inferred to be equal to 0;

tile_width_minus1[i] plus 1: specifies the width of the i-th tile in subtile units; and tile_height_minus1[i] plus 1: specifies the height of the i-th tile in subtile units.

Stereo video, which has been around for quite some time, is commonly packed into one frame either by using side-by-side packing or top-bottom packing, as seen in FIGS.

6A-6B, respectively). With stereo video, each eye receives a separate view of an image in which the viewpoint for the second view is shifted slightly compared to the first view (e.g. the viewpoint for the user's left eye is slightly shifted when compared to the viewpoint for the user's right eye).

There are some drawbacks to the use of stereo video. Particularly, when the user is moving, the immersive experience is reduced.

Figure 17:
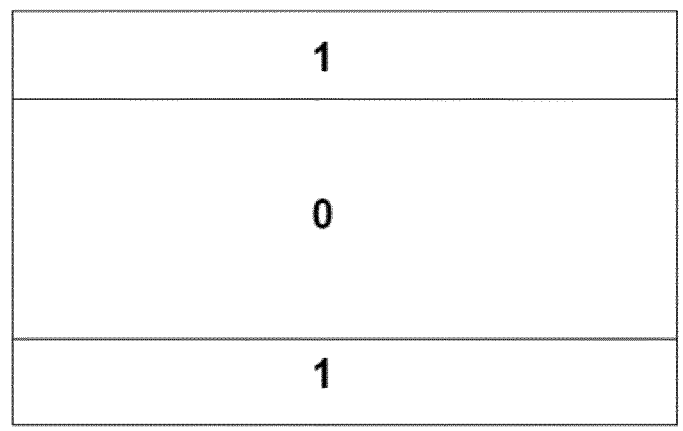
FIG. 17 illustrates frame packing for texture plus depth according to one embodiment.

To be able to at least partly look around objects, i.e. to slightly shift viewports, a combination of texture and depth information may be used where additional views may be synthesized from the texture and depth information. Texture plus depth is typically also frame packed within one picture, either side-by-side, top-bottom or some other way (e.g., see FIG. 17).

MPEG is currently working on some activities for immersive video to be published in the MPEG-I set of standards. One activity relates to 3 degrees of freedom (3DoF), also referred to as 360° video. In these activities, the user may look in all directions of a sphere using a head mounted display (HMD). As for stereo video, the viewpoint is fixed.

Another activity relates to extended 3 degrees of freedom video (3DoF+). With 3DoF+, the user experiences the whole sphere as in 360° video, but has the freedom to look around objects to some extent by slightly moving the head. To realize this technically, a 3DoF+ scene is built up from a large number of views containing both texture and depth information. Intermediate views are synthesized using texture and depth from neighboring views.

MPEG has also an activity related to six degrees of freedom (6DoF) video. In 6DoF video, the user has full flexibility to look around objects in a much larger volume compared to 3DoF+. In some cases, not only can the user stand, but may also be able to possibly walk around. One approach is to implement 6DoF video using a combination of background video and point cloud objects. Point cloud objects are described with geometry information, textures, and attributes attached to each point in the point cloud. Attributes may include, but are not limited to, color values (e.g. RGB textures), reflectance, occupancy, and opacity, which may be represented as texture maps, reflectance maps, occupancy maps and opacity maps.

Figure 7A:
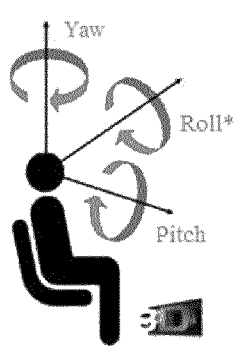
FIGS. 7A-7C illustrate use cases for 3DoF, 3DoF+ and 6DoF video, respectively.
Figure 7B:
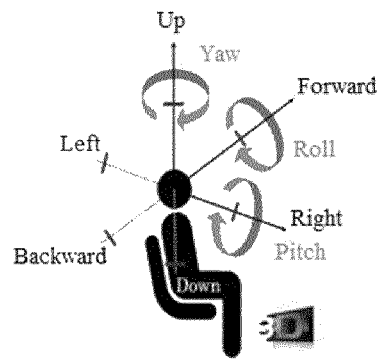
Figure 7C:
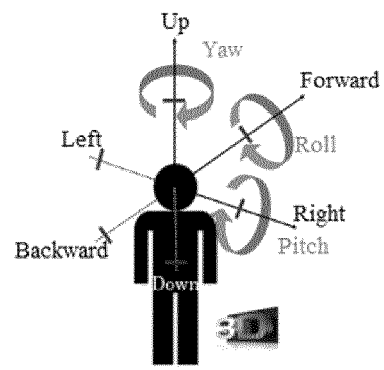

The use cases for 3DoF, 3DoF+ and 6DoF are illustrated, respectively, in FIGS. 7A-7C. All of 3DoF, 3DoF+ and 6DoF could support stereo viewing; however, for each of these technologies, some kind of frame packing is likely to occur.

Although flexible tiles improves the flexibility of tiles as compared to HEVC, it does not solve how the video data is efficiently grouped in the bit stream. For example, in many video services, including immersive video, partial video data may be extracted from the video. Having the video data grouped into chunks instead of scattered in different places in the bit stream speeds up the extraction and decoding. Simple cases, such as dividing the picture into two parts (e.g. stereo frame packed side-by-side) may be resolved using tiles and slices in HEVC. However, for more complex cases related to 3DoF video, 3DoF+ video, and 6DoF video, this is not possible with the current definition of tiles and slices in HEVC.

Embodiments of the present disclosure address these issues, however, by introducing "tile groups" to video codecs configured to process an image partitioned into tiles. Particularly, each tile is assigned to a tile group using a tile group ID. This tile group IDs may be used to identify which region of a picture each tile belongs to. There is no requirement that all parts of a region be spatially adjacent. Tile groups may, for instance, be the cube faces in a cube map, the two views in frame packed stereo video, or the texture and depth fields in frame packed texture plus depth video. Further, the tiles within each tile group may be scanned in a predefined order (e.g. raster scan order). This allows each tile group to be extracted individually as one chunk thereby negating the need to assemble several tiles to construct the desired part of the video. As for the tile groups, they, too, may be scanned in any order needed or desired, such as raster scan order, or in the order of their tile group IDs. Other scanning orders are also possible.

Embodiments of the present disclosure provide benefits and advantages not provided by convention encoding and decoding methods. For example, embodiments of the present disclosure provide a mapping between the tiles of a picture and their logical grouping in the picture. This can be useful for frame packed video such as stereo video, texture plus depth video, 3DoF video, 3DoF+ video and 6DoF video.

Another advantage provided by the present embodiments flows from the fact that tiles related to each other (e.g., in terms of content type or geometry of the scene) are grouped as tile groups in the bit stream. These tile groups can therefore be extracted as one chunk. This is in contrast to tiles in HEVC, where such related tiles can be scattered over the bit stream. Grouping the tiles as in the present embodiments, therefore, will speed up extraction of tile groups from the bit stream and improve latency.

Additionally, tile groups may be ordered in the bit stream in the order of importance (e.g. the front cube face first in cube maps). The most important tiles may then more easily be decoded and rendered first, which further decreases the perceived latency.

Moreover, as previously stated, each tile group has its own tile group ID. This tile group ID can, in some embodiments, indicate how the tiles of a given video should be interpreted at the systems layer. For instance, consider a frame packed side-by-side stereo picture. In such situations, the tiles with a tile group ID of '0' could be associated with the right view, and tiles having a tile group ID '1' are associated with the left view. So assigned, the tiles could be processed according to the user's right and left view. Corresponding labels could also be assigned to the tile groups using the tile group IDs.

Yet another advantage is that the present embodiments make it possible to define certain attributes for a given tile group. Such attributes include, but are not limited to, attributes defining motion constraints and in-loop filter constraints for each tile group, and attributes to allow motion and in-loop filtering between tiles within a tile group, but constrained to between tile groups.

In a first embodiment, tiles are grouped into tile groups using a tile group ID. The tile group ID may be signaled, for example, in the PPS, the SPS, or in slice or tile header. Tiles belonging to the same tile group are encoded and decoded in a pre-determined order within the tile group, such as raster scan order, for instance. The tiles are scanned contiguously such that all tiles in the tile group are scanned one after another. No tiles from outside the tile group are scanned while the tiles in the tile group is being scanned. By scanning the tiles in a tile group contiguously, all tiles in a tile group may be decoded or extracted from the bit stream in a single chunk, rather than having to first extract the tiles from different parts of the bit stream and then assemble them.

Figure 8:
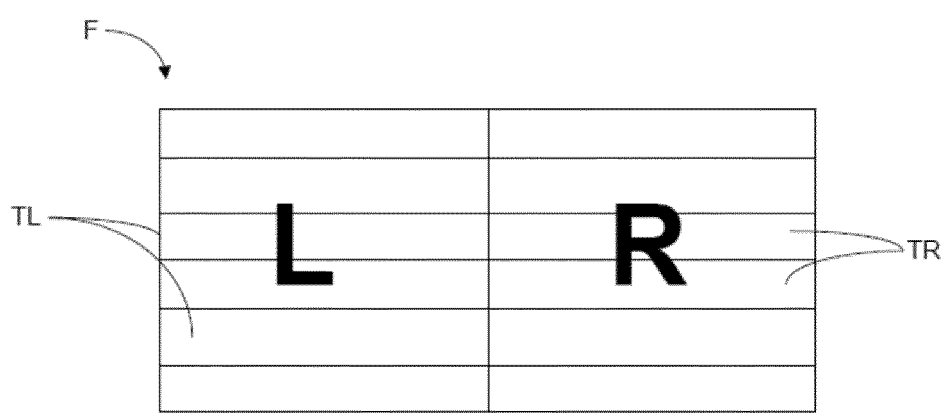
FIG. 8 illustrates a stereo picture with side-by-side frame packing.

This can been seen using a simple case illustrated in FIG. 8. As seen in this figure, a stereo video is frame packed using the side-by-side format. The tiles TL associated with a first viewpoint are on the left ('L') side of the frame F, while the tiles TR associated with a second viewpoint are situated on the right ('R') side of the frame F. For parallel processing reasons, each view is divided into several tiles.

Figure 9A:
FIG. 9A illustrates an order of tiles in the bit stream when not using tile groups. White indicates tiles belonging to a left view and gray indicates tiles belonging to a right view.
Figure 9B:
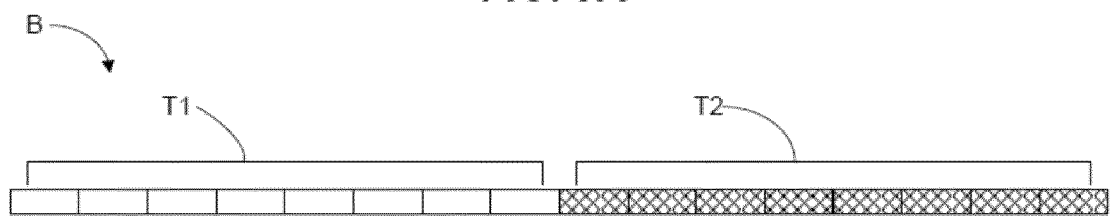
FIG. 9B illustrates an order of tiles in the bit stream when using tile groups. White indicates tiles belonging to a left view and gray indicates tiles belonging to a right view.

FIGS. 9A-9B illustrate the order of the tiles in the bit stream B. Particularly, FIG. 9A illustrates the order of the tiles T when the HEVC tile syntax is used. In this conventional case, the tiles T are scanned in raster scan order. Thus, every second tile TR in the bit stream B belongs to the right view R and the other tiles TL in the bit stream B belong to the left view L. FIG. 9B, however, illustrates the order of the tiles T when they are grouped according to the present embodiments. In these cases, each tile group is scanned contiguously one-by-one. Thus, the tiles T for each tile group (i.e., the tiles in the first group T1 of unshaded tiles and the tiles in the second group T2 of shaded tiles) are contiguous in the bit stream B.

In one embodiment, tile groups are encoded and decoded in the bit stream in the order of the tile group IDs. For example, in increasing order.

In another embodiment, the tile groups T1, T2 are encoded and decoded in raster scan order. In the context of this disclosure, "raster scan order" for the tiles T within a tile group T1, T2 is defined as the raster scan order for the top left corner of the tiles in the tile group. However, the raster scan order for tile groups T1, T2 is defined as the order in which the tile groups T1, T2 first occur when scanning the picture pixel-by-pixel (or block-by-block or CTU-by-CTU) in raster scan order. Alternatively, raster scan order for tile groups T1, T2 may also be defined as the raster scan order for the top left corner of the first tile in each tile group T1, T2.

In one embodiment, an order indicator, such as a flag, for example, is signaled to indicate whether the tile groups are scanned in tile group ID order or in raster scan order.

Figure 10:
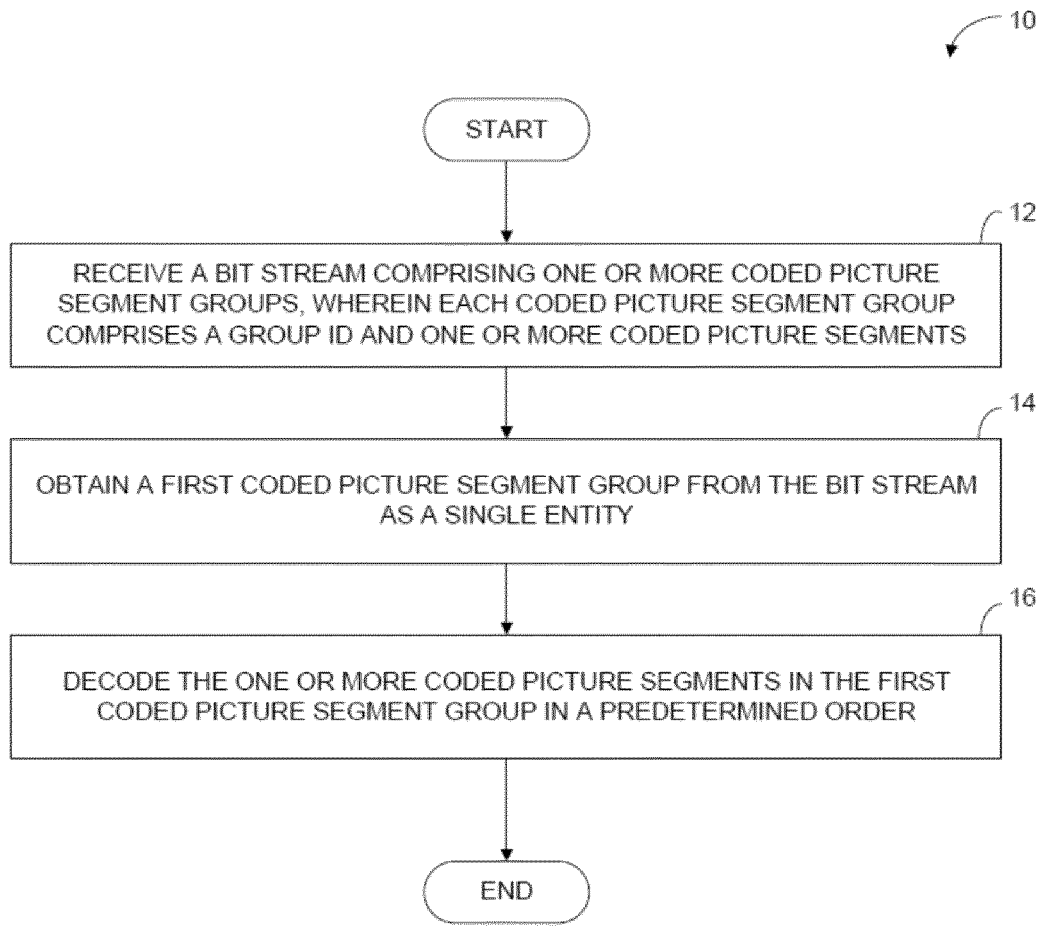
FIG. 10 is a flow diagram illustrating a method implemented at a decoder according to one embodiment.

FIG. 10 illustrates a method 10 for decoding a bit stream B according to the present disclosure. In this embodiment, a decoder receives a bit stream B comprising one or more coded picture segment groups (e.g., "tiles groups T1, T2") (box 12). Each picture segment group comprises a group ID and one or more coded picture segments (e.g., "tiles" T). Once received, the decoder extracts a first picture segment group from the bit stream as a single entity (box 14). As stated above, this differs from conventional methods (e.g., HEVC) that first extract the picture segments in a given group from different parts of the received bit stream B before assembling the picture segments in the appropriate order. Thus, the present embodiments enhance the operation of the decoder by speeding up extraction of tile groups from the bit stream B and improving latency. Once the tile group has been extracted, method 10 calls for decoding the one or more picture segments in the first picture segment group in a predetermined order (box 16).

As previously described, tiles T can be assigned to a tile group T1, T2 by an encoder using the tile group ID. However, such assignments are not always required. For example, in one embodiment, tiles T are assigned to tile groups T1, T2 without explicitly using a tile group ID. For instance, when defining the tile structure, a first step would be to define the tile groups T1, T2. Once defined, the tiles T would then be assigned to a given tile group T1, T2 without explicitly assigning any tile group ID to the tiles T.

Figure 11:
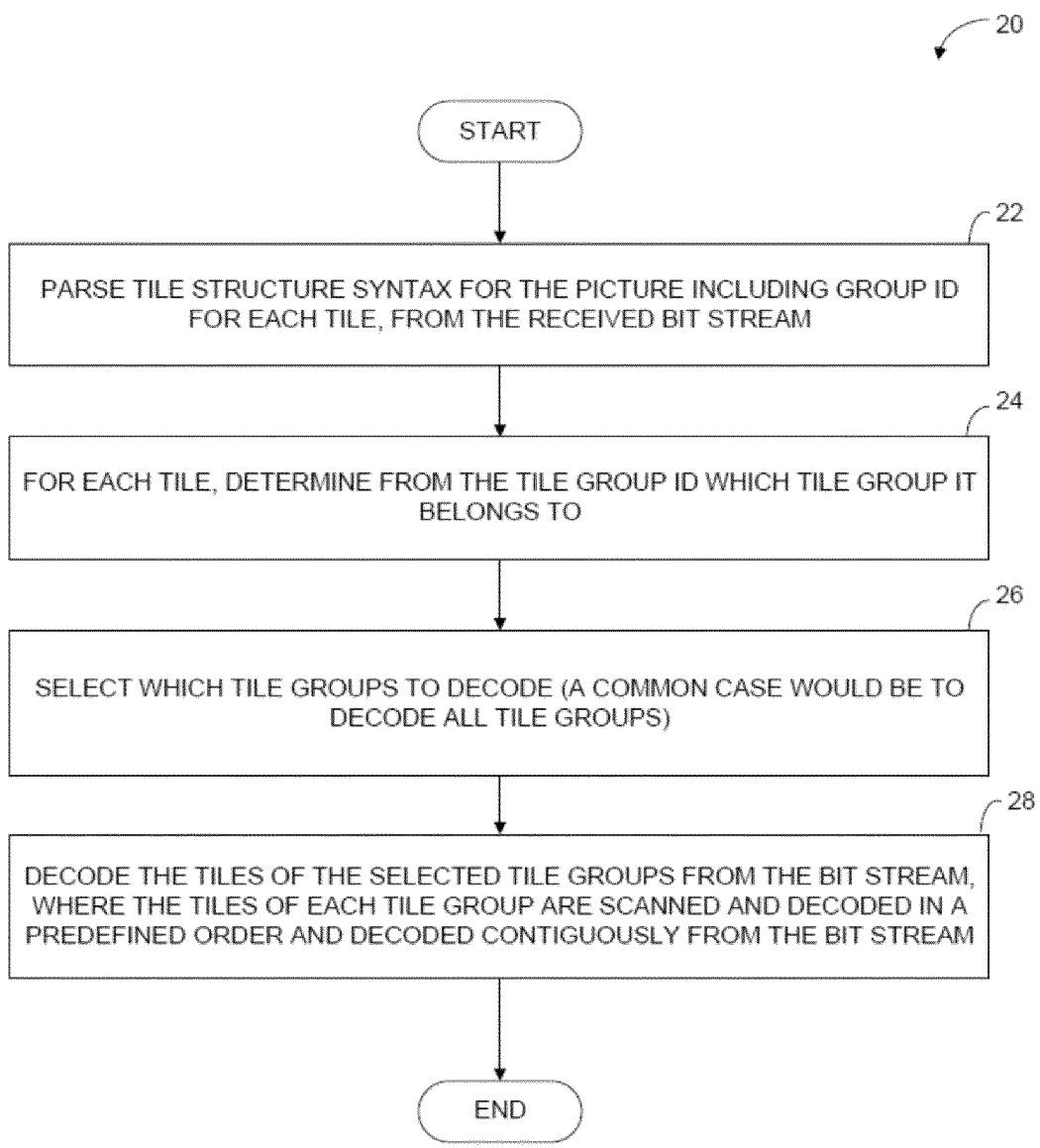
FIG. 11 is a flow diagram illustrating a method for decoding a picture or part of picture, with tiles grouped with tile group IDs, from a bit stream according to one embodiment.

FIG. 11 illustrates a method 20 for decoding a picture or part of picture, with tiles grouped with tile group IDs, received in a bit stream B according to the present disclosure. Those of ordinary skill in the art will appreciate that method 20 is implemented at a decoder.

As seen in FIG. 11, method 20 begins with the decoder parsing the tile structure syntax for a picture, including group ID for each tile T, from the received bit stream B (box 22). For each tile T, the decoder determines the tile group T1, T2 to which it belongs based on the tile group ID (box 24). The decoder then selects which tile groups T1, T2 to decode (box 26). In a common case, for example, the decoder would decide to decode all tile groups T1, T2. Once determined, the decoder decodes the tiles T of the selected tile groups from the bit stream B (box 28). More particularly, the tiles T of each tile group T1, T2 are scanned and decoded in a predefined order, and then decoded contiguously from the bit stream B. In one aspect of this embodiment, the tile groups T1, T2 are also scanned and decoded in the explicit order of their tile group IDs.

Figure 12:
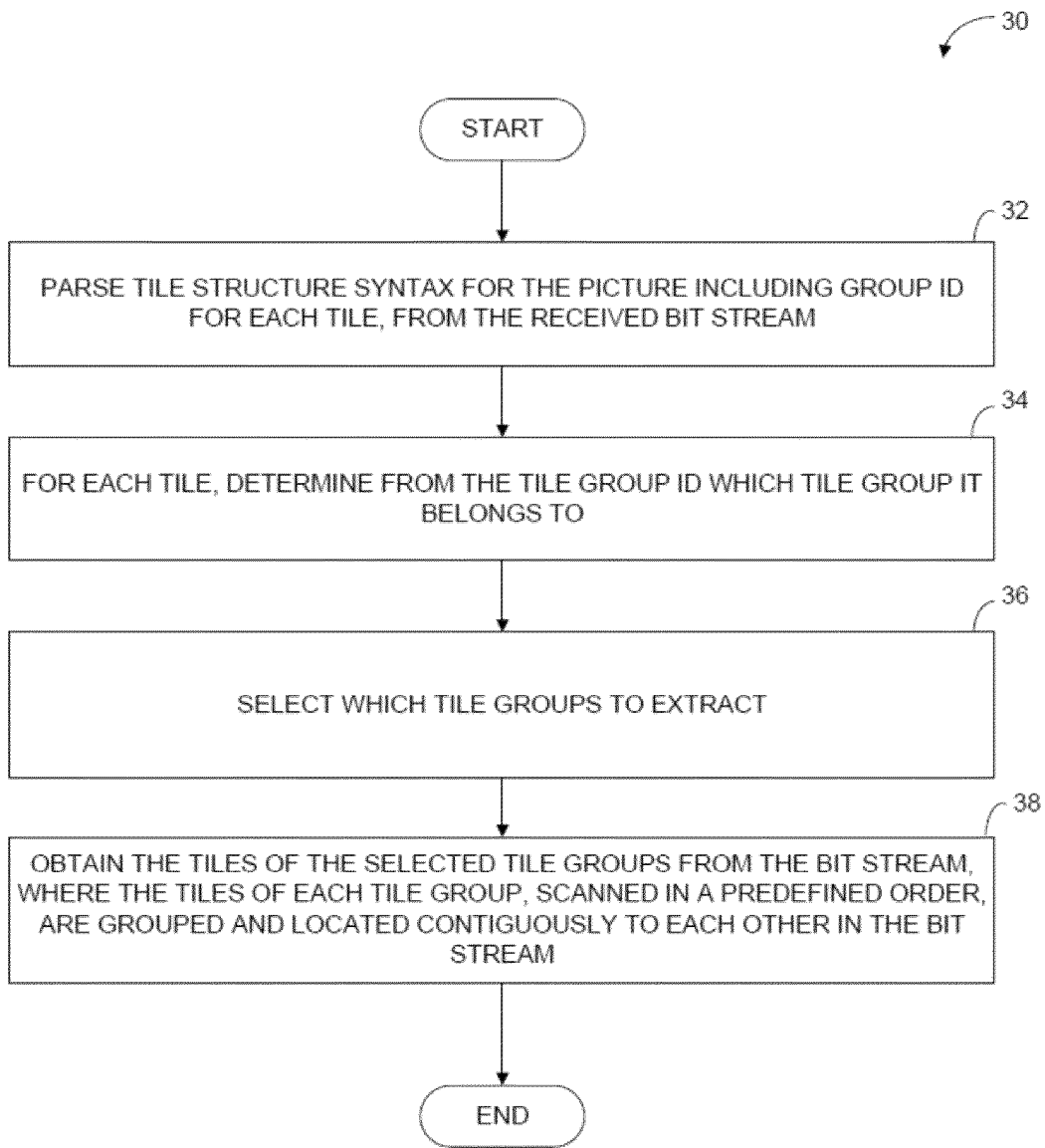
FIG. 12 is a flow diagram illustrating a method for extracting a part of picture from a picture, with tiles grouped with tile group IDs, from a bit stream according to one embodiment.

FIG. 12 illustrates a method 30, implemented at a decoder, for extracting a part of picture from a picture with the tiles T grouped with tile group IDs from the received bit stream B. As seen in FIG. 12, method 30 begins with the decoder parsing the tile structure syntax for the picture to obtain the group ID for each tile T (box 32). Then, for each tile T, the decoder determines to which tile group T1, T2 the tile belongs based on the tile group ID (box 34). The decoder then selects which tile groups T1, T2 to extract from the received bit stream (box 36), and extracts the tiles T of the selected tile groups T1, T2 from the bit stream (box 38). The tiles T of each tile group T1, T2, scanned in a predefined order, are grouped and located contiguously to each other in the bit stream B. In one aspect of this embodiment, the tile groups T1, T2 are also scanned and extracted in the explicit order of their tile group IDs.

Figure 13:
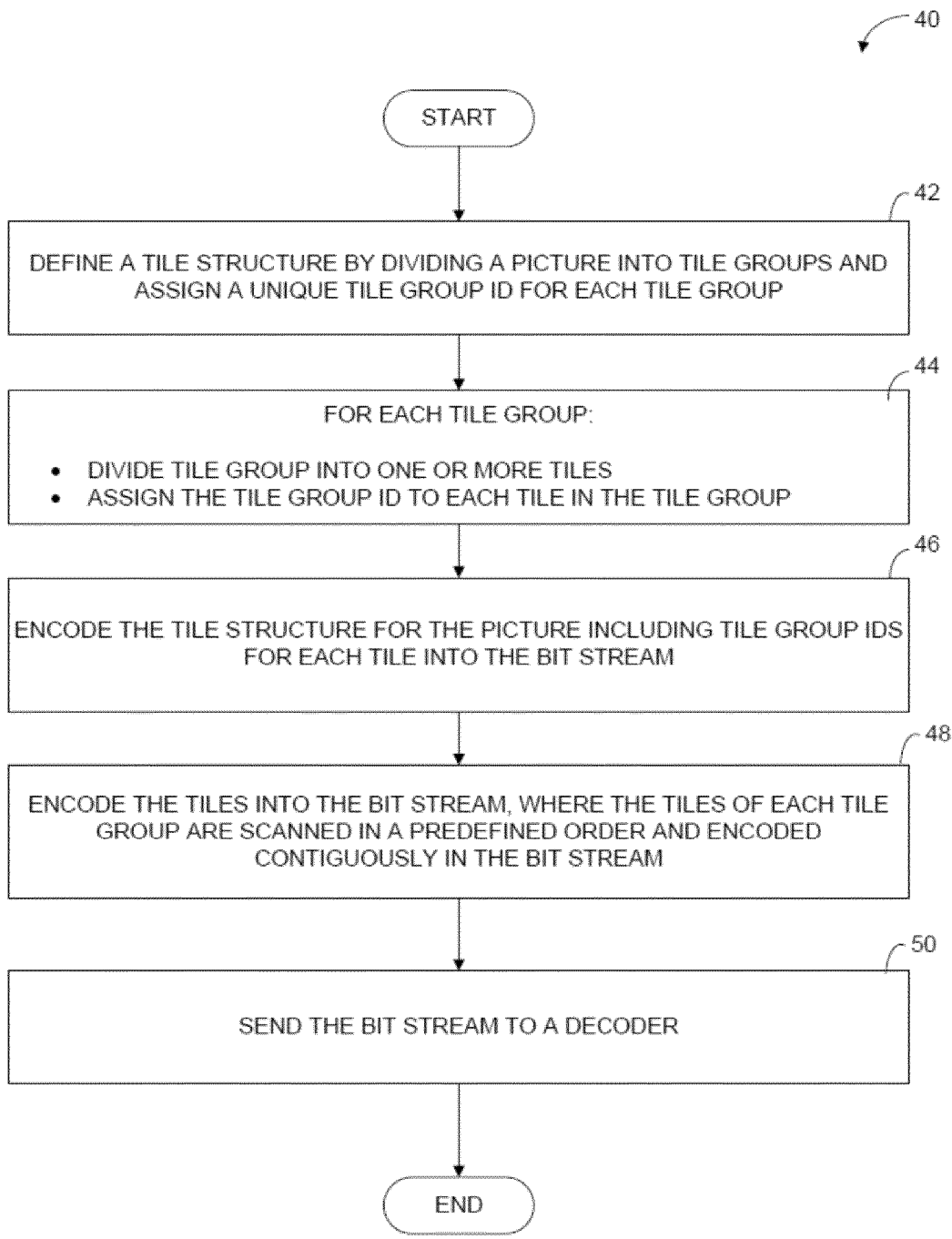
FIG. 13 is a flow diagram illustrating a method for encoding a picture, with tiles using tile group IDs, into a bit stream according to one embodiment.

FIG. 13 illustrates a method 40, implemented at an encoder, for encoding a picture, with tiles T using tile group IDs, into a bit stream B. As seen in FIG. 13, method 40 begins with the encoder defining a tile structure (box 42). In this embodiment, the encoder divides the picture into tile groups T1, T2 and assigns a unique tile group ID to each tile group T1, T2. Then, for each tile group, the encoder divides the tile group into one or more tiles T and assigns the tile group ID to each tile in the tile group (box 44). Once the tiles T are assigned to a tile group T1, T2, the encoder encodes the tile structure for the picture including tile group IDs for each tile T into the bit stream B (box 46), and encodes the tiles into the bit stream (box 48). In this embodiment, the tiles of each tile group are scanned in a predefined order and encoded contiguously in the bit stream. However, those of ordinary skill in the art will readily appreciate that the present disclosure is not so limited. In one aspect, for example, the tile groups are scanned and encoded in the explicit order of their tile group IDs. So encoded, the encoder sends the bit stream to the decoder for decoding (box 50).

FIGS. 14A-14D illustrate tile grouping according to one embodiment. As seen in the figures, FIG. 14A illustrates a typical cube map for 360° video. A cube map is divided into six cube faces—left (L), front (F), right (R), bottom (BM), back (BK) and top (T). Cube faces are marked with solid lines. The dotted lines are tile borders. One way to save bandwidth in 360° video for head mounted displays (HMD) is to divide a picture into several tiles. This allows for the transmission to the HMD of only those tiles that are in the current viewpoint of the HMD. In this example, each cube face L, F, R, BM, BK, and T is divided into 16 tiles.

FIG. 14B illustrates a scan order of the tiles, which in this case is the raster scan order used for tiles in HEVC. To extract one full cube face in the example, it is always required to assemble four "tile chunks." As defined herein, a "tile chunk" comprises a set of contiguous tiles in the bit stream.

FIG. 14C illustrates a scan order using tile group IDs in raster scan order. Particularly, each cube face L, F, R, BM, BK, and T corresponds to a respective tile group. The unique tile group ID of each tile group (i.e., cube face) is assigned to the tiles in that tile group. So assigned, each cube face L, F, R, BM, BK, and T can be decoded or extracted as only one tile chunk.

FIG. 14D illustrates a scan order using tile group IDs. Particularly, the scan order is by increasing tile group ID in which each tile group is assigned a unique tile group ID (i.e., 0, 1, 2, 3, 4, 5) and is scanned in raster scan order. As seen in this figure, the cube faces have been assigned the tile group IDs differently and are scanned in the order of the tile group IDs. Scanning the tile groups in order of tile group IDs allows for scanning the tiles in order of importance. This can be important for low-delay applications such as 360° video.

Another example of tile grouping is depicted in FIG. 15. As above, the tile group borders are marked with solid lines and the tile borders are marked with dotted lines. As seen in this embodiment, the encoder packs two different resolutions of the same cube map into one frame. Each cube face L, F, R, BM, BK, and T of the high-resolution cube map is a tile group, while the low-resolution cube map could be divided into two tile groups—the first tile group being cube faces (L, F, and R) and the second tile group being cube faces (BM, BK, and T).

In the embodiment of FIG. 15, the encoder packs the frame with multiple resolutions, and packs multiple cube faces into corresponding tile groups. However, those of ordinary skill in the art should appreciate that the present disclosure is not so limited. In one aspect, the encoder utilizes only a single tile group for each resolution.

In another embodiment, the encoder partitions a picture P into tile groups based on the segmented rectangular frame packing arrangement SEI message defined in annex D of HEVC, which states: "Constituent frame 0 is obtained by cropping from the decoded frames the region R0 and constituent frame 1 is obtained by stacking vertically the regions R2 and R3 and placing the resulting rectangle to the right of the region R1. The region R4 is not part of either constituent frame and is discarded. Thus, in this aspect, the encoder of the present disclosure is configured to rearrange the frame packing arrangement to ensure that the pictures can be contiguous in the bit stream that is sent to the decoder.

Figure 16:
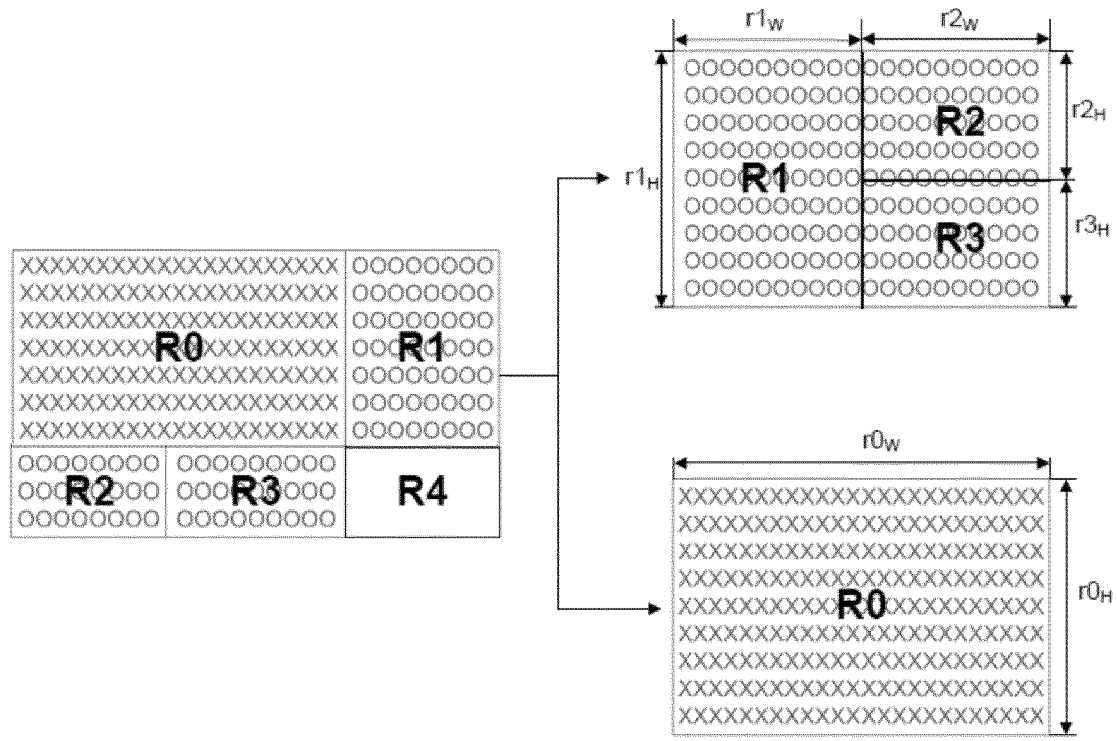
FIG. 16 illustrates a rearrangement of a segmented rectangular frame packing arrangement according to one embodiment.

FIG. 16 illustrates this embodiment in which regions R0 becomes one picture frame F1, and regions R1, R2, and R3 become another picture frame F2. If each region R0, R1, R2, R3, and R4 in frames F1 and F2 were a corresponding tile group, then the encoder could encode each region and place it into the bit stream such that the two constituent picture frames F1, F2 would be contiguous in the bit stream in HEVC. However, there is not always a one-to-one correspondence between regions and tile groups. For example, if each region R0, R1, R2, R3, and R4 comprises more than one tile in the height H of the region, the parts of the constituent picture frames F1, F2 would not be contiguous in the bit stream. Thus, by using tile grouping according to this embodiment, an encoder can place the two constituent picture frames F1, F2 contiguously in the bit stream for the frame packed picture.

An example of tile group IDs on top of HEVC tiles is shown in Table.

TABLE 3

HEVC tile syntax using tile group ID

| pic_parameter_set_rbsp( ) { | Descriptor |
|---|---|
| ... | |
|   tiles_enabled_flag | u(1) |
| ... | |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     tile_group_ids_enabled_flag | u(1) |
|     if ( tile_group_ids_enabled_flag ) | |
|       for( i = 0; i < ( num_tile_columns_minus1 + 1 ) * ( num_tile_rows_minus1 + 1 ); i++ ) | |
|         tile_group_id[ i ] | ue(v) |
|     loop_filter_across_tiles_enabled_flag | u(1) |
|   } | |
| ... | |

Semantics for the Syntax Elements in Table 3 tile_group_ids_enabled_flag: when equal to 1, this flag specifies that a tile group ID is signaled for each tile. When equal to 0, this flag specifies that each tile belongs to the same tile group, and that tile_group_id[i] is inferred to be 0.

tile_group_id[i] this flag specifies the tile group ID for the tile with index i. The tile_group_id[i] shall be between 0 and maxTileGroupID.

Table 4 illustrates an example of tile group ID for a flexible tile solution.

TABLE 4

Flexible tile syntax using tile group ID

| pic_parameter_set_rbsp( ) { | Descriptor |
|---|---|
| ... | |
|   tiles_enabled_flag | u(1) |
| ... | |
|   if( tiles_enabled_flag ) { | |
|     number_of_tiles_in_picture_minus2 | ue(v) |
|     subtile_width_minus1 | ue(v) |
|     subtile_height_minus1 | ue(v) |
|     tile_group_ids_enabled_flag | u(1) |
|     for ( i=0; i < number_of_tiles_in_picture_minus2+2 ; i++ ) { | |
|       if ( tile_group_ids_enabled_flag ) | |
|         tile_group_id[ i ] | ue(v) |
|       if ( i > 0) | |
|         use_previous_tile_size_flag | u(1) |
|       if ( use_previous_tile_size_flag == 0) { | |
|         tile_width_minus1[ i ] | ue(v) |
|         tile_height_minus1[ i ] | ue(v) |
|       } | |
|     } | |
|     loop_filter_across_tiles_enabled_flag | u(1) |
|   } | |
| ... | |

Semantics for the Syntax Elements in Table 4 tile_group_ids_enabled_flag: when this flag is equal to 1, it specifies that a tile group ID is signaled for each tile. When this flag is equal to 0, it specifies that each tile belongs to the same tile group, and that tile_group_id[i] is inferred to be 0.

tile_group_id[i] specifies the tile group ID for the tile with index i. tile_group_id[i] shall be between 0 and maxTileGroupID.

maxTileGroupID: This parameter is defined to be a large constant value (e.g., 256) for flexibility reasons. In some embodiments, this parameter may be defined as the number of tiles; however, defining this parameter as the number of tiles places a restriction when using tile group IDs. Particularly, gaps are not allowed in the range of used tile group IDs when this parameter is defined as the number of tiles. Such restrictions can be problematic if tile groups are extracted from the bit stream.

The syntax in Tables 3 and 4 above describes how each tile is assigned a tile group ID by signaling the tile ID for each tile. In another version of this embodiment, however, the spatial structure of each tile group is first defined and signaled in the bit stream together with a unique tile group ID. Then each tile group is divided into tiles where the descriptive syntax for this is signaled in the bit stream.

In one embodiment of the present disclosure, a label is assigned to each tile group ID. Such labels may be, for instance, picture types for frame packed pictures (e.g., the left and right views in stereo video), or the texture and depth parts in texture plus depth packed video. The assignment of the labels to tile group IDs may be signaled in SPS, in PPS, in an SEI message, or in the system layer such as in ISOBMFF or OMAF boxes. A label may comprise descriptive text, a reference to a descriptive text an integer or a dynamic expression.

The following use case examples apply for both embodiment 1 and embodiment 2 discussed above.

An example of a stereo picture with side-by-side frame packing was previously illustrated in FIG. 8. To support parallel processing, each view was divided into several tiles. The first tile group is assigned the "left view" label L and the second tile group is assigned the "right view" label R. Not only does such labeling make it straightforward for a decoder to extract the tiles T belonging to only one of the views (e.g., TL and TR as in FIG. 8), but by grouping all tiles in the left view L with a first tile group with tile group ID 0, and the tiles in the right view R with a second tile group with tile group ID 1, the encoder can group tiles belonging to the same view together in the bit stream.

An example of a common frame packing of texture plus depth is depicted in FIG. 16. As seen in this figure, this embodiment of the present disclosure partitions a picture frame into multiple tiles. The tiles related to the texture of a picture are in the middle and are encoded as one tile belonging to tile group 0. The tile group 0 is assigned the label "TEXTURE." The tiles related to the depth map, which has been spatially compressed and horizontally divided, are seen above and below the texture portion, and are encoded as two tiles belonging to tile group 1. The tile group 1 is assigned the "DEPTH" label.

In the 3DoF+ video project in MPEG, to be able to accurately represent a scene without disocclusion artifacts, up to 25 textures and depth maps are used. One method is to transmit the centralized view in full resolution (5760× 2880 for each of texture and depth), and transmit sparse representations of the other 24 views in reduced resolution, but encoded with a higher QP than the central view. After decoding, the sparse representations are combined with the centralized view to form each of the other 24 views. Intermediate views in between any of the 25 views are constructed using neighboring textures and depth maps.

Figures 18, 19:
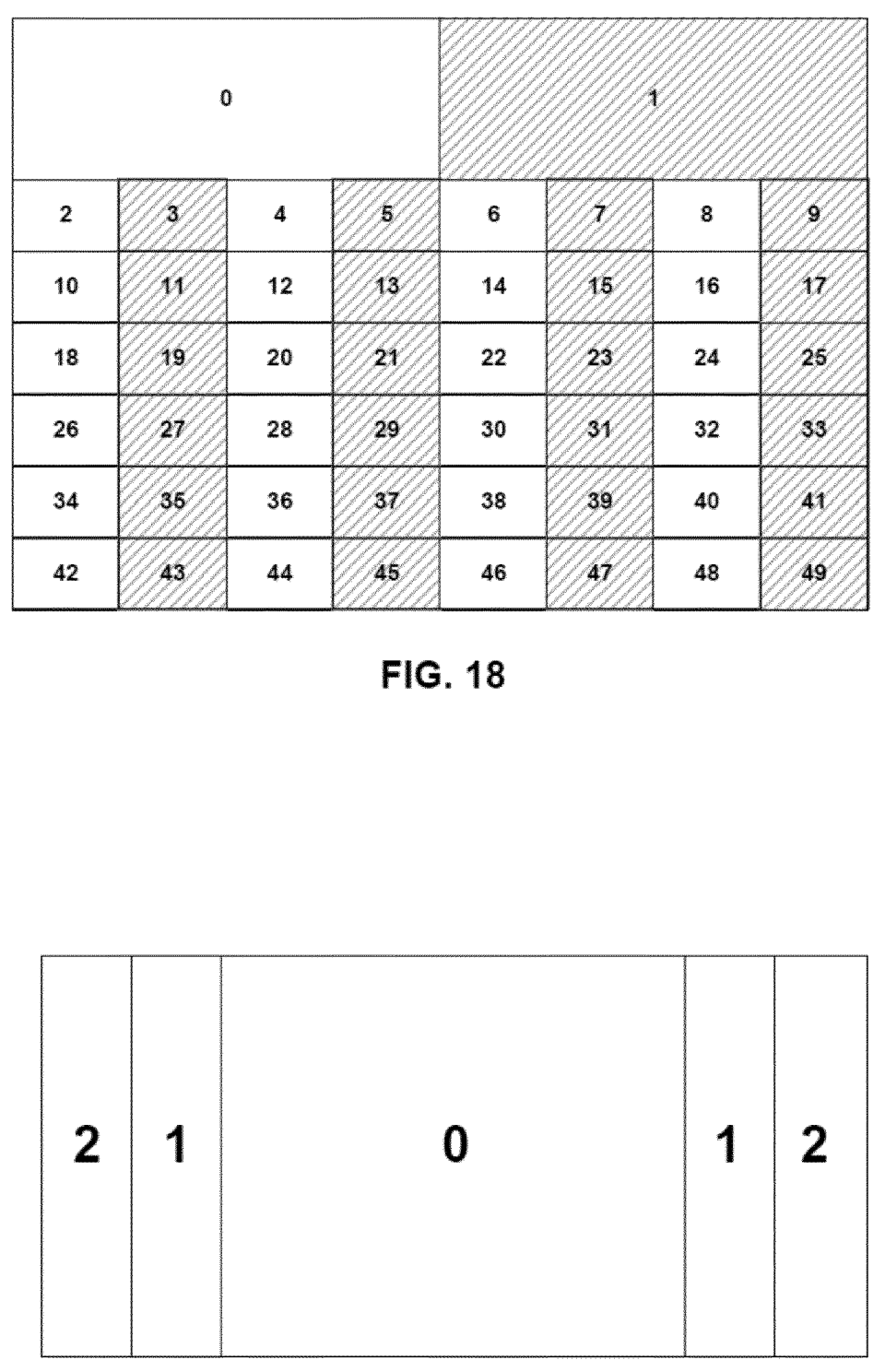

The packing of the views for the compression domain may be done in one or more (e.g., a few) pictures. An example of how a packing into one frame could look like for the 3DoF+ views is shown in FIG. 18. As seen in FIG. 18, each of the textures (depicted in white) and depth maps (depicted in gray) belongs to a unique tile group. Each may comprise several tiles for spatial random access reasons.

The tile group IDs for the tile groups are shown in FIG. 18. Tile group 0 may be assigned the label "CENTRALIZED TEXTURE" and tile group 1 may be assigned the label "CENTRALIZED DEPTH". The sparse views are numbered from 0 to 23. Tile group 2 may be assigned the label "SPARSE TEXTURE 0" and tile group 3 may be assigned the label "SPARSE DEPTH 0", while tile group 4 and 5 are assigned the labels "SPARSE TEXTURE 1" and "SPARSE DEPTH 1", etc. If for example the 3DoF+ player wants to render a view in between sparse view 22 and 23 it asks the decoder to decode the tile groups with labels "CENTRALIZED TEXTURE", "CENTRALIZED DEPTH", "SPARSE TEXTURE 22", "SPARSE DEPTH 22", "SPARSE TEXTURE 23" and "SPARSE DEPTH 23" which corresponds to the tile groups with tile group IDs 0, 1, 46, 47, 48 and 49. All tiles in the respective tile groups are extracted in full chunks and decoded before a synthesized view is created and rendered from the decoded textures and depth maps.

In the 6DoF video project in MPEG, a full VR experience may be created by adding background video together with point cloud objects, where point cloud objects are created with geometry information and point attributes that may include color values (e.g. RGB), reflectance (I) and opacity. Common for the background video, the point cloud geometry information and the point attributes can be described and compressed as video. Using a common frame packing assures time alignment of the frames and simplifies the decoding procedure. Each background picture and the geometry information, color values, reflectance and opacity for each point cloud object may be assigned to a unique tile group ID, which can be mapped to a descriptive label. This allows for easy access of the specific parts of a scene. It is especially useful if the parts of a scene are divided into several tiles, which provides spatial random access.

Labels may also relate to the aspect ratio of the video. One example is when the video is recorded in a wider aspect ratio than the device decoding the video can display. Normally, the full bit stream would be sent to the receiving device, and the receiving device would decode the bit stream and crop the video.

However, consider instead that the video bit stream is encoded using three different tile groups as illustrated in FIG. 19. The parts for tile group 1 and tile group 2 are not spatially adjacent. Tile group 0 would represent a 4:3 aspect ratio, the combination of tile groups 0 and 1 would represent a 16:9 wide screen aspect ratio, and the combination of tile groups 0, 1 and 2 would represent a 2.35:1 anamorphic projection aspect ratio as seen in FIG. 20.

In one embodiment, the assignment of labels to the tile groups can be as follows:

Tile group ID 0 is assigned to label "4:3 ASPECT RATIO AND WIDER";
Tile group ID 1 is assigned to label "16:9 ASPECT RATIO AND WIDER"; and
Tile group ID 2 is assigned to label "2.35:1 ASPECT RATIO."

In an aspect of this embodiment, labels are mapped to one or more tile group IDs. In such aspects, then, the mapping of tile group IDs to labels could be as follows:

"4:3 ASPECT RATIO" is mapped to tile group ID 0;
"16:9 ASPECT RATIO" is mapped to tile group ID 0 and 1;
"2.35:1 ASPECT RATIO" is mapped to tile group ID 0, 1 and 2.

If the sender is aware that the receiving device only may display a certain aspect ratio, e.g. the 4:3 aspect ratio, the sender may choose to only send the video for that aspect ratio, i.e. tile group with tile group ID 0. If the sender is un-aware of the display capabilities of the receiving device, however, it may send the full bit stream. In these latter cases, the receiving device may then decide to only decode the tile group with tile group ID 0 to save some processing power.

The previous embodiments describe grouping tiles in a single layer. However, those of ordinary skill in the art will readily appreciate that the present disclosure is not so limited. In one embodiment of the present disclosure, multiple layers of tile grouping is supported. In more detail, a tile group can comprise one or more tile sub-groups, which in turn, may comprise one or more tiles. Thus, according to this embodiment, tile groups can be referred to as tile groups of a certain level. For instance, a tile group of level 1 may comprise one or more tile sub-groups of level 2, which then can comprise one or more tiles.

The scan order for the one or more tile sub-groups within a given tile group can be any scan order needed or desired, so long as the tile-sub-groups are placed contiguously into the bit stream. However, one embodiment of the disclosure scans the tile sub-groups within a given tile group in order before placing the tile sub-groups contiguously in the bit stream.

As an example, one practical use case for tile sub-groups within tile groups can be derived from the 3DoF+ example illustrated in FIG. 18. A first level of the hierarchy (e.g., "Level 1") could comprise a tile group assigned the label "TEXTURE" and a tile group assigned the label "DEPTH". A second level of the hierarchy (e.g., "Level 2") could comprise the tile sub-groups assigned the labels "CENTRALIZED VIEW", and the labels "SPARSE VIEW 0" to "SPARSE VIEW 22." As an example, extracting all textures, then, would be fairly straightforward since the decoder would merely need to know that the so-called "Level 1" tile group with label "TEXTURE" is to be extracted.

Another practical use case for tile sub-groups within tile groups can be seen in the cube map example illustrated in FIG. 15. Particularly, in this example, the encoder assign those tile groups to "Level 1" based on resolution, and assign the cube faces of the cube map to the tile sub-groups or "Level 2" tile groups.

In another embodiment, a set of attributes are defined for each tile group. Attributes may define how the tiles in the tile group are decoded. The attributes may also provide information about the tile group, such as the relative video quality of the tile group, etc. Each attribute may be defined for each tile group individually, or defined to be the same for all tile groups in the picture. A tile group attribute may also be referred to as a tile group property or a tile group parameter.

An example of the tile group attributes to be defined per tile group according to the present disclosure is the "delta_QP" value. In one embodiment, the delta_QP value can be defined as the difference between the quantization parameter (QP) value of a reference and the QP for the tile group. The reference QP value may be the QP value signaled for a parameter set, picture, slice, or the like. The QP value for a tile group may be the initial QP value for the tile group, for example the QP value used for the first block in the first tile in the tile group, or the QP value to use for predicting the QP value for the first block in the first tile in the tile group.

In another embodiment, the delta_QP value can be defined as the difference between the QP value of the previous tile group and the QP value of the current tile group. In one example, if a tile group in the picture has texture content and another tile group in the picture has depth content, the delta_QP can be beneficially defined per tile group (i.e., on a per tile group basis), thereby supporting situations in which different tile groups may want to use different QP values. In such embodiments, for example, a first tile group may be coded using a high QP value while a second tile group may be coded using a low QP value.

Other examples of tile group attributes are the so-called "de-blocking parameters" (e.g., de-blocking filter strength). In HEVC, the strength of a de-blocking filter can be adjusted by the encoder on a per-picture and/or per-slice basis. Further, according to the present disclosure, de-blocking parameters can be provided on a per tile group basis, and therefore, be adapted to the content of each tile group.

In HEVC, tile boundaries, similarly to slice boundaries, break parsing and spatial prediction dependencies so that a tile can be processed independently. However, the in-loop filters (e.g., de-blocking and SAO filters) may still cross tile boundaries in order to optionally prevent tile border artifacts. This functionality is controlled by the loop_filter_across tiles_enabled_flag syntax element in the PPS. Setting this functionality per tile group is another example of a tile group attribute according to the present disclosure. Particularly, in cases where some of the tile groups in the picture are independent in their contents while other tile groups are dependent, it is possible to set the loop_filter_across tile_groups_enabled_flag per tile group. Thus, this flag can be disabled for the tile groups with independent content, and enabled for the tile groups with dependent content.

Another example of a tile group attribute, similar to how MCTS works for tiles, is to signal whether inter-prediction is or is not allowed between tile groups. If inter-prediction is allowed, then inter-prediction is allowed over tile boundaries within the tile group, but not over tile group boundaries. This may be signaled to be the same for all tile groups or it may be signaled individually for each tile group.

A tile group attribute example is shown in Table 5 below with syntax and semantics for tile group inter prediction and in-loop filtering on top of HEVC.

TABLE 5

| HEVC tile syntax using tile group ID and tile group attributes | |
|---|---|
| pic_parameter_set_rbsp( ) { | Descriptor |
| ... | |
| tiles_enabled_flag | u(1) |
| ... | |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
|   tile_group_ids_enabled_flag | u(1) |
|   if ( enable_tile_group_ids_flag ) { | |
|     for(i = 0; i < (num_tile_columns_minus1 + 1 ) * | |

TABLE 5-continued

HEVC tile syntax using tile group ID and tile group attributes

| pic_parameter_set_rbsp( ) { | Descriptor |
|---|---|
| (num_tile_rows_minus1 + 1 ); i++ ) | |
|     tile_group_id[ i ] | ue(v) |
|   if ( loop_filter_across_tiles_enabled_flag ) | |
|     loop_filter_across_tile_groups_enabled_flag | u(1) |
|     prediction_across_tile_groups_enabled_flag | u(1) |
|   } | |
| } | |
| ... | | loop_filter_across_tiles_enabled_flag: When this flag is equal to 1, it specifies that in-loop filtering operations may be performed across tile boundaries in pictures referring to the PPS. When this flag is equal to 0, it specifies that in-loop filtering operations are not performed across tile boundaries in pictures referring to the PPS. The in-loop filtering operations include the deblocking filter and sample adaptive offset filter operations. When not present, the value of loop_filter_across_tiles_enabled_flag is inferred to be equal to 1.

tile_group_ids_enabled_flag: When this flag is equal to 1, it specifies that a tile group ID is signaled for each tile. When this flag is equal to 0, it specifies that each tile belongs to the same tile group and tile_group_id[i] is inferred to be 0.

tile_group_id[i]: This specifies the tile group ID for the tile with index i. The valid values for tile_group_id[i] shall be between 0 and maxTileGroupID.

loop_filter_across_tile_groups_enabled_flag: When this flag is equal to 1, it specifies that in-loop filtering operations may be performed across tile group boundaries in pictures referring to the PPS. When this flag is equal to 0, it specifies that in-loop filtering operations are not performed across tile group boundaries in pictures referring to the PPS. The in-loop filtering operations include the deblocking filter and sample adaptive offset filter operations. If loop_filter_across_tiles_enabled_flag is equal to 0, loop_filter_across_tile_groups_enabled_flag is inferred to be 0. Else, when not present, the value of loop_filter_across_tile_groups_enabled_flag is inferred to be equal to 1.

prediction_across_tile_groups_enabled_flag: When this flag is equal to 1, it specifies that sample values outside each tile group or outside the picture may be referenced for inter prediction. When this flag is equal to 0, it specifies that no sample values outside each tile group or outside the picture are referenced for inter prediction. Moreover, motion vector candidates derived from blocks outside the current tile group may not be used for prediction. When not present, the prediction_across_tile_groups_enabled_flag is inferred to be equal to 1.

According to one embodiment, the loop_filter_across_tile_groups_enabled_flag is signaled if the loop_filter_across_tiles_enabled_flag is set to 1. If loop filtering has been disabled for tile boundaries, loop filtering is automatically disabled for tile group boundaries. In these cases, it would not make sense to signal a value for loop_filter_across_tile_groups_enabled_flag.

As stated previously, one attribute that may be defined on a per tile group basis is the delta_QP value. In one embodiment, for example, the decoder is configured to determine a reference QP value (refQP) from the sequences parameter set or picture parameter set. Then, a delta_QP value signaled for each tile group according to any of the previously described embodiments.

Focusing on one tile group T as an example, consider the corresponding delta_QP value to be deltaQP1. Optionally, there may be a deltaQP2 signaled for the first block of the first tile of tile group T. The delta_QP value to use for the first block then becomes refQP+deltaQP1+deltaQP2. If there is no deltaQP2 for the block, which can occur, for example, when the first block does not comprise any non-zero transform coefficients, the QP value for the first block becomes refQP+deltaQP1.

The QP value assigned for the first block is used for scaling decoded transform coefficients. However, according to the present embodiments, the QP value may also be used in the deblocking process of sample values near the boundary between the first block and a neighboring block. The possibility of signaling a delta_QP value on a per tile group basis, according to this embodiment, is beneficial because it allows the decoder to "stitch" tile groups originating from different bit streams into one output bit stream. By way of example, a first tile group T1 may have been encoded into a bit stream B1 using QP value Q1, while a second tile group T2 may have been encoded into a bit stream B2 using QP value Q2. If T1 and T2 are stitched into one output bit stream without the possibility to set a tile group QP, it may not be possible to set the QP values for T1 and T2 correctly in the output stream. By making delta_QP part of the tile group attributes and use one of the previous embodiments, correct QP values can be set for all output tile groups.

Note that in HEVC, the block delta_QP is only signaled for blocks that contain at least one non-zero transform coefficient. This means that if the first blocks in the first tile in tile group T1 and T2 do not contain any non-zero coefficient, it may not be possible to assign the correct QP value for both blocks if tile groups T1 and T2 are stitched together into one picture unless slice headers are inserted.

Embodiments herein are described with reference to an encoder and a decoder, such as an encoder 60 and decoder 80 illustrated in FIGS. 21 and 22, respectively. The encoder 60 and decoder 80 could be implemented using a suitable combination of hardware and/or software. Accordingly, an encoder comprising one or more processors and e.g. one or more memories is configured to carry out the methods according to the embodiments herein.

Figure 21:
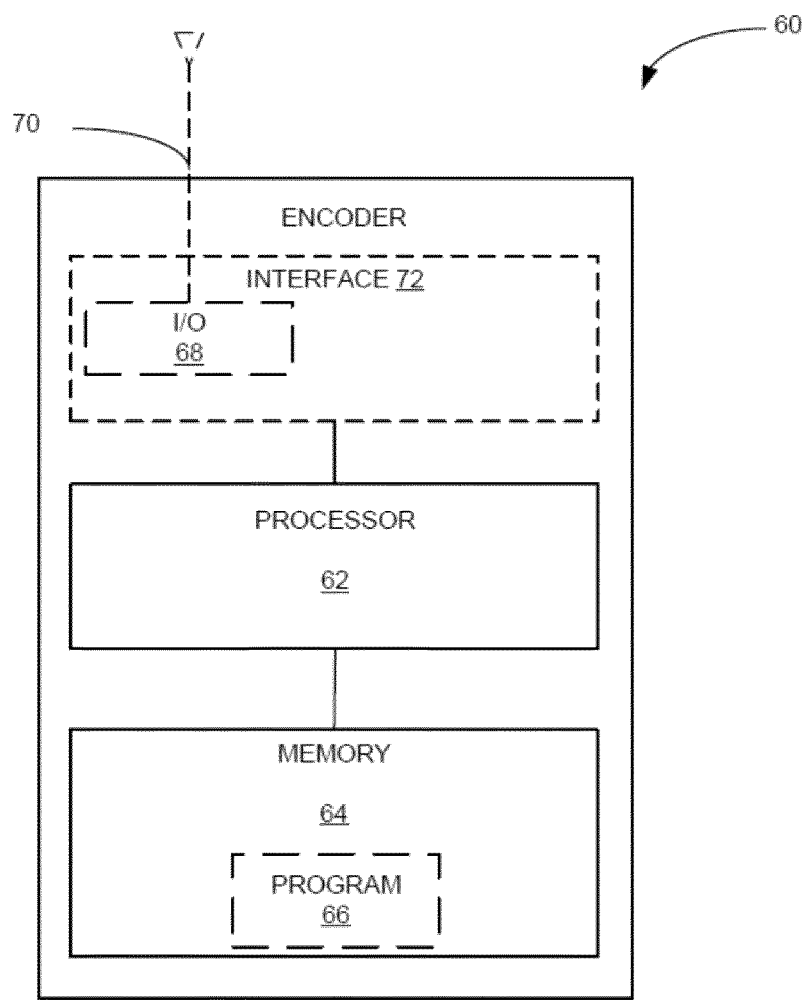
FIG. 21 is a schematic diagram of an encoder configured according to one embodiment.

FIG. 21 is a schematic diagram of an example encoder 60 comprising a communications interface 72, an input/output circuit 68, processor 62, one or more memories 64, and a computer program 66 stored in memory 64. The processor 62 could be any combination of one or more of a suitable central processing unit (CPU), multiprocessor, microcontroller, digital signal processor (DSP), application specific integrated circuit (ASIC) etc., capable of executing software instructions contained in computer program 66 stored in one or more memories 64. The one or more memories 64 is for instance a data buffer, Read-Write Memory (RWM), Read-Only memory (ROM), random-access memory (RAM), cache memory, flash memory devices, optical storage devices, etc. The communications interface 72 can comprise an input and/or output circuit 68 configured to transmit a bit stream, e.g., via transmitter or transceiver antenna 70.

Figure 22:
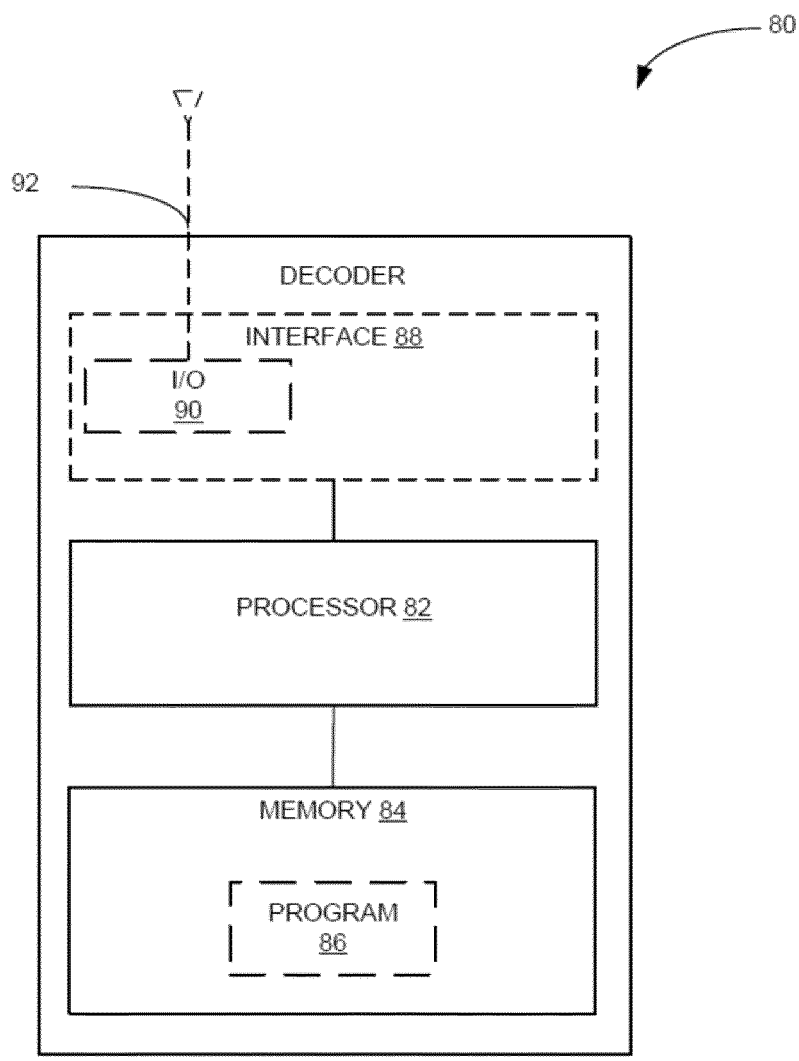
FIG. 22 is a schematic diagram of a decoder configured according to one embodiment.

FIG. 22 is a schematic diagram showing some components of an example decoder 80 comprising one or more processors and e.g. one or more memories. The decoder 80 seen in FIG. 22 is configured to carry out the decoding process according to the embodiments herein.

Particularly, as seen in FIG. 22, decoder 80 comprises a processor 82, a communications interface 88, an input/output circuit 90, one or more memories 84, and a computer program 86. The processor 82 could be any combination of one or more of a suitable central processing unit (CPU), multiprocessor, microcontroller, digital signal processor (DSP), application specific integrated circuit (ASIC) etc., capable of executing software instructions contained in a computer program 86 stored in one or more memories 84. The one or more memories 84 is for instance, a data buffer, Read-Write (RWM) Memory or Read-Only (ROM) memory. The decoder 80 comprises a communications interface 88 with an input and/or output circuit 90 configured to receive a bit stream, e.g., via a receiver or transceiver.

Figure 23:
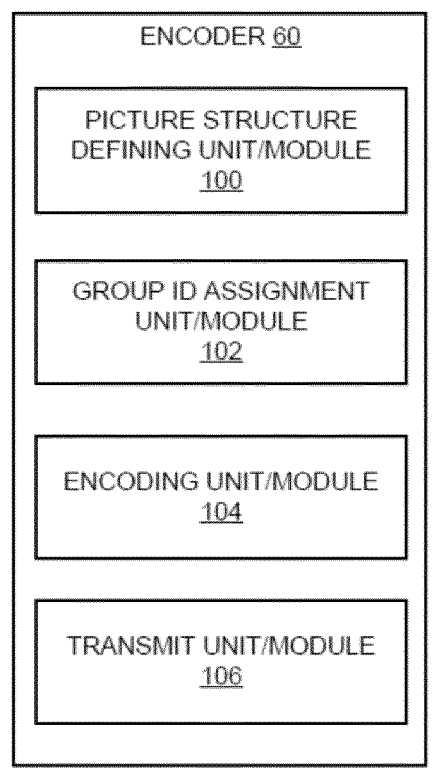
FIG. 23 is a schematic block diagram illustrating some functional components of an encoder according to one embodiment.

As shown in FIG. 23 an encoder 60 could have units, modules, or circuits configured to carry out methods described herein. For instance, the encoder 60 comprises a picture structure defining unit/module 100 configured to define a structure for a picture segment unit as described herein. Particularly, the picture structure defining unit/module 100 divides the picture into a plurality of picture segment groups, and assigns a unique group ID to each picture segment group. The group ID assignment unit/module 102, for each picture segment group, divides the picture segment group into one or more tiles and assigns the group ID of the picture segment group to each of the picture segments in the picture segment group. The encoding unit/module 104 encodes the picture segments of each of the picture segment groups into the bit stream, and the transmit unit/module 106 sends the encoded bit stream to a decoder, such as decoder 80.

Figure 24:
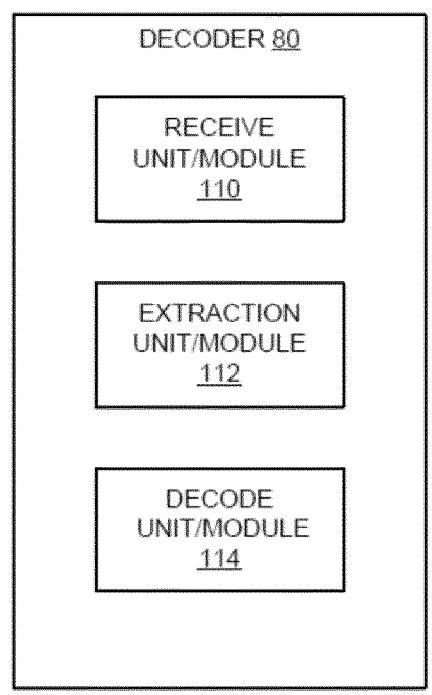
FIG. 24 is a schematic block diagram illustrating some functional components of a decoder according to one embodiment.

As shown in FIG. 24, decoder 80 could also have units, modules, or circuits configured to carry out methods described herein. For instance, in this embodiment, decoder 80 comprises a receive unit/module 110 configured to receive a bit stream as described herein. Particularly, the bit stream comprises one or more coded picture segment groups, with each picture segment group comprising a group ID and one or more coded picture segments. The extraction unit/module 112 extracts a first picture segment group from the bit stream as a single entity, and the decode unit/module 114 decodes the one or more picture segments in the first picture segment group in a predetermined order, as p[previously described.

Figure 25:
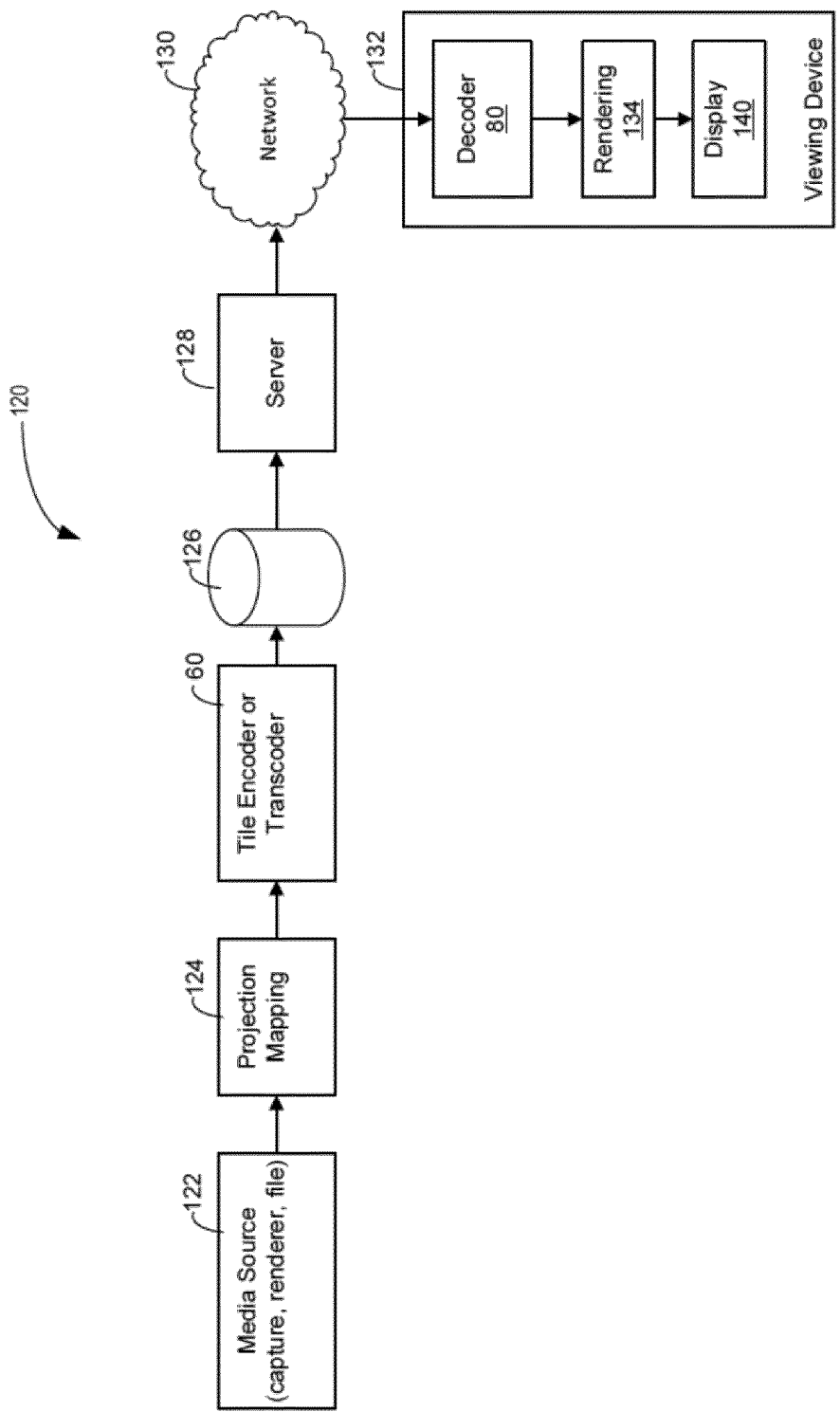
FIG. 25 is a system comprising an encoder and a decoder according to one embodiment of the present disclosure.

FIG. 25 shows an example system or method 120 in which an encoder 60 and/or decoder 60 configured according to the present embodiments described herein would be useful. The system 120 comprises a media source 122 (e.g., a capture, renderer or file). The media source 122 is fed to a projection mapping 124 and then to a tile encoder or transcoder (e.g. encoder 60) configured as previously described herein. The encoded information (e.g., the bit stream) can be stored in storage 126 and then fed to a server 128. It can be transmitted over a network 130 to a viewing device 132. For example, the image is one of video, and the viewing device 132 has a decoder 80 configured as described herein for decoding bit stream, rendering 134 the decoded picture and displaying the image on a display 140 to a user of the viewing device 132. Such a viewing device can be, for example, a Head Mounted Display (HMD) device or any display device.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of decoding a picture, the method comprising:

receiving a bit stream comprising one or more coded picture segment groups, wherein each coded picture segment group comprises a group identifier (ID) and one or more coded picture segments that are contiguous in the bit stream and belong to a same viewpoint;

obtaining a first coded picture segment group from the bit stream as a single entity, wherein the group ID and the one or more coded picture segments that are comprised in the first coded picture segment group are obtained as the single entity; and decoding the one or more coded picture segments in the first coded picture segment group in a predetermined order, wherein decoding the one or more coded picture segments in the first coded picture segment group in a predetermined order comprises scanning the one or more coded picture segments in the first coded picture segment group contiguously.

2. The method of claim 1 wherein each of the coded picture segment groups is associated with a unique descriptive label, and wherein obtaining a first coded picture segment group from the bit stream as a single entity comprises obtaining the first coded picture segment group based on the descriptive label for the first coded picture segment group.

3. The method of claim 2 wherein the association between each of the coded picture segment groups and the unique descriptive label are:

decoded from at least one of a sequence parameter set (SPS), a picture parameter set (PPS), or a supplemental enhancement information (SEI) message; or retrieved from a system layer structure.

4. The method of claim 2 wherein the descriptive label for the first coded picture segment group identifies:

one of a left view and a right view of a stereo picture with side-by-side frame packing; or the coded picture segments within the first coded picture segment group as being associated with one of a texture of the picture and a depth map of the picture.

5. The method of claim 2 wherein the bit stream received from the encoder comprises a first view of the picture in a first resolution, and one or more second views of the picture in a second resolution, wherein the first resolution is a higher than the second resolution.

6. The method of claim 2 wherein the descriptive label identifies an aspect ratio for the first coded picture segment group.

7. The method of claim 1 wherein at least one of the coded picture segment groups received in the bit stream comprises one or more coded picture segment sub-groups, with each of the one or more coded picture segment sub-groups further comprising the one or more coded picture segments.

8. The method of claim 1 wherein at least one of the plurality of coded picture segment groups comprises a cube map, with each face of the cube map representing a corresponding one of the plurality of coded picture segment groups.

9. The method of claim 1 further comprising receiving, for each of the plurality of coded picture segment groups, a corresponding delta quantization parameter (QP) (delta_QP) value.

10. The method of claim 9 wherein the delta_QP value comprises:

a difference between a quantization parameter (QP) value of a reference and a QP value for the coded picture segment group; or a difference between a QP value of a previous coded picture segment group and a QP value of a current coded picture segment group.

11. The method of claim 9 further comprising determining a reference QP from at least one of a sequences parameter set and a picture parameter set.

12. A decoder comprising:
communications interface circuitry configured to receive a bit stream comprising one or more coded picture segment groups from an encoder, wherein each coded picture segment group comprises a group identifier (ID) and one or more coded picture segments that are contiguous in the bit stream and belong to a same viewpoint; and
processing circuitry configured to:
obtain a first coded picture segment group from the bit stream as a single entity, wherein the group ID and the one or more coded picture segments that are comprised in the first coded picture segment group are obtained as the single entity; and
decode the one or more coded picture segments in the first coded picture segment group in a predetermined order by scanning the one or more coded picture segments in the first coded picture segment group contiguously.

13. A non-transitory computer-readable storage medium having executable instructions stored thereon that, when executed by a processing circuit in a decoder, causes the decoder to:
receive a bit stream comprising one or more coded picture segment groups from an encoder, wherein each coded picture segment group comprises a group ID and one or more coded picture segments that are contiguous in the bit stream and belong to a same viewpoint;
obtain a first coded picture segment group from the bit stream as a single entity, wherein the group ID and the one or more coded picture segments that are comprised in the first coded picture segment group are obtained as the single entity; and
decode the one or more coded picture segments in the first coded picture segment group in a predetermined order by scanning the one or more coded picture segments in the first coded picture segment group contiguously.

* * * * *

UNITED STATES PATENT AND TRADEMARK OFFICE
CERTIFICATE OF CORRECTION

| | |
|---|---|
| PATENT NO. | : 11,477,470 B2 |
| APPLICATION NO. | : 16/957527 |
| DATED | : October 18, 2022 |
| INVENTOR(S) | : Pettersson et al. |

It is certified that error appears in the above-identified patent and that said Letters Patent is hereby corrected as shown below:

In the Specification

In Column 5, Lines 41-42, delete "uniform spacing flag" and insert -- uniform_spacing_flag --, therefor.

In Column 8, Line 21, delete "HVEC." and insert -- HEVC. --, therefor.

In Column 15, Line 8, delete "tiles" and insert -- files --, therefor.

In Column 21, Lines 5-6, delete "Read-Write (RWM) Memory or Read-Only (ROM) memory." and insert -- Read-Write Memory (RWM) or Read-Only Memory (ROM). --, therefor.

Signed and Sealed this
Fourth Day of April, 2023

Katherine Kelly Vidal
*Director of the United States Patent and Trademark Office*